(12) United States Patent
Parks, Jr. et al.

(10) Patent No.: US 11,599,933 B2
(45) Date of Patent: *Mar. 7, 2023

(54) SYSTEMS AND METHODS FOR ON-DEMAND DELIVERY

(71) Applicant: TOMMY RUN LLC, Atlanta, GA (US)

(72) Inventors: Bernard Parks, Jr., Atlanta, GA (US); Jimmy Jayant Patel, Roswell, GA (US)

(73) Assignee: TOMMY RUN LLC, Atlanta, GA (US)

( * ) Notice: Subject to any disclaimer, the term of this patent is extended or adjusted under 35 U.S.C. 154(b) by 97 days.

This patent is subject to a terminal disclaimer.

(21) Appl. No.: 17/094,881

(22) Filed: Nov. 11, 2020

(65) Prior Publication Data

US 2021/0065280 A1 Mar. 4, 2021

Related U.S. Application Data

(63) Continuation of application No. 15/927,167, filed on Mar. 21, 2018, now Pat. No. 10,872,370.
(Continued)

(51) Int. Cl.
*G06Q 30/06* (2012.01)
*G06Q 30/0601* (2023.01)
(Continued)

(52) U.S. Cl.
CPC ....... *G06Q 30/0635* (2013.01); *G06Q 20/322* (2013.01); *G06Q 30/0601* (2013.01);
(Continued)

(58) Field of Classification Search
CPC .......... G06Q 30/0635; G06Q 30/0601; G06Q 30/0637; G06Q 10/0833; G06Q 20/322; G08G 1/202
(Continued)

(56) References Cited

U.S. PATENT DOCUMENTS 7,177,825 B1 2/2007 Borders et al.
8,014,756 B1 9/2011 Henderson
(Continued)

FOREIGN PATENT DOCUMENTS

JP 2005178958 A * 7/2005 ............. G06F 17/60

OTHER PUBLICATIONS

Article, "U.S. Patent and Trademark Office Releases Bank of America's Patent Application for Anonymous Electronic Payment System", Publication info: Global IP News. Banking Patent News [New Delhi] Sep. 10, 2015; retrieved from Dialog on May 30, 2022.*

(Continued)

*Primary Examiner* — Yogesh C Garg
(74) *Attorney, Agent, or Firm* — Thompson Hine LLP

(57) ABSTRACT

Systems and techniques are disclosed that provide device-based coordination of multi-party delivery processes. One example implementation involves receiving a payer-invite request from a requester device. The payer-invite request requests an invitation be sent to a payer to pay for a delivery order. The delivery order specifying one or more items to be purchased and delivered to a requester location associated with the requester device or inputted by the requester. The system sends the invitation to a payer device associated with the payer and receives a payment from the payer device. The system fulfills the delivery order by identifying a fulfillment center, a driver, and/or a puller and sending communications with order information and instructions to the devices of those parties to coordinate the delivery. For example, the system sends a driving instruction to a driver device instructing the driver to pick up and deliver the items.

25 Claims, 12 Drawing Sheets

Related U.S. Application Data

(60) Provisional application No. 62/585,896, filed on Nov. 14, 2017.

(51) Int. Cl.
*H04W 4/02* (2018.01)
*G08G 1/00* (2006.01)
*G06Q 20/32* (2012.01)
*H04W 4/029* (2018.01)
*G06Q 10/0833* (2023.01)

(52) U.S. Cl.
CPC ......... *G06Q 30/0637* (2013.01); *G08G 1/202* (2013.01); *H04W 4/023* (2013.01); *H04W 4/029* (2018.02); *G06Q 10/0833* (2013.01)

(58) Field of Classification Search
USPC ..................................................... 705/26.82
See application file for complete search history.

(56) References Cited

U.S. PATENT DOCUMENTS

| | | | |
|---|---|---|---|
| 8,234,211 B2 | 7/2012 | Ray et al. | |
| 8,326,755 B2 | 12/2012 | Petersen et al. | |
| 8,510,181 B2 | 8/2013 | Creedle et al. | |
| 8,996,390 B2 | 3/2015 | Miyata | |
| 9,316,740 B2 | 4/2016 | Ghinamo | |
| 9,727,871 B2 | 8/2017 | Allin et al. | |
| 11,461,767 B2* | 10/2022 | Foerster | G06Q 20/20 |
| 2007/0192111 A1* | 8/2007 | Chasen | G06Q 10/08 |
| | | | 705/338 |
| 2007/0255653 A1 | 11/2007 | Tumminaro et al. | |
| 2008/0004038 A1 | 1/2008 | Dunko | |
| 2010/0114733 A1 | 5/2010 | Collas et al. | |
| 2012/0226614 A1 | 9/2012 | Gura et al. | |
| 2013/0185206 A1 | 7/2013 | Leggett et al. | |
| 2013/0260790 A1 | 10/2013 | Itzhaki et al. | |
| 2013/0268435 A1 | 10/2013 | Sivaraman | |
| 2014/0081854 A1 | 3/2014 | Sanchez et al. | |
| 2014/0095400 A1 | 4/2014 | Jackson et al. | |
| 2015/0120514 A1* | 4/2015 | Deshpande | G06Q 30/016 |
| | | | 705/28 |
| 2015/0142594 A1 | 5/2015 | Lutnick et al. | |
| 2016/0071056 A1 | 3/2016 | Ellison et al. | |
| 2016/0125317 A1 | 5/2016 | Benjamin | |
| 2016/0171503 A1 | 6/2016 | Nelsen | |
| 2016/0180305 A1* | 6/2016 | Dresser | G06Q 20/32 |
| | | | 705/40 |
| 2016/0189098 A1 | 6/2016 | Beaurepaire et al. | |
| 2016/0253758 A1 | 9/2016 | Riggle | |
| 2016/0328781 A1* | 11/2016 | Patel-Zellinger | |
| | | | G06Q 30/0635 |
| 2016/0342997 A1* | 11/2016 | De Tella | G06Q 20/382 |
| 2017/0124511 A1 | 5/2017 | Mueller et al. | |
| 2017/0177891 A1 | 6/2017 | Hampson et al. | |
| 2017/0221058 A1 | 8/2017 | Choudhary et al. | |
| 2017/0286893 A1* | 10/2017 | Clark | G06Q 10/063112 |

OTHER PUBLICATIONS

PCT, U.S. Patent and Trademark Office (ISA/US), International Search Report and Written Opinion of the International Searching Authority, International Application No. PCT/US2018/056454, 12 pages, dated Jan. 4, 2019.

* cited by examiner

THIRD PARTY APPROVAL FLOW MOCKUP:

FOR USER 1:

1. Create Order for Approval:

| <Back =Menu | Shopping Cart | Cart Pic |
|---|---|---|
| List of Items (Add/Remove Items) | | |
| Cart Sub-Total | | |
| Checkout | | |
| Select Approver | | |
| Continue Shopping | | |

FIG. 6A

2. Select Approver:

| <Back =Menu | Approver | Cart Pic |
|---|---|---|
| Search (Contacts) | | |
| List of Contacts (Select Contact) | | |

FIG. 6B

8. View Order After Order Denied:

| <Back =Menu | Shopping Cart | Cart Pic |
|---|---|---|
| | List of Items (Change quantity/Remove Items) | |
| | Cart Sub-Total | |
| | Checkout | |
| | Select Approver (Disabled Here) | |
| | Continue Shopping | |

FIG. 6H

7. Order Activity (Denied):

| =Menu | Orders |
|---|---|
| | Start New Order |
| | List of Orders |
| | Order Details Status: Denied |
| VIEW/EDIT | RESEND APPROVAL |

FIG. 6G

SYSTEMS AND METHODS FOR ON-DEMAND DELIVERY

RELATED APPLICATIONS

This patent application is a continuation of U.S. patent application Ser. No. 15/927,167 filed Mar. 21, 2018, which claims the benefit of U.S. Provisional Application No. 62/585,896 filed on Nov. 14, 2017, entitled "SYSTEMS AND METHODS FOR ON-DEMAND DELIVERY OF CONSTRUCTION MATERIALS AND OTHER ITEMS," each of which is incorporated herein by this reference in its entirety.

FIELD OF THE INVENTION

This disclosure relates generally to methods, devices, and systems associated with the delivery of items.

BACKGROUND

Construction projects often require contractors and other construction workers to waste time and resources obtaining materials, tools, and other items that are needed at a job site. For example, a contractor working on a basement remodeling project may run into a surprise setback or run out of material quicker than expected, and need to spend time identifying a nearby hardware store that has the relevant items, drive from the job site to the store, collect and purchase the items within the store, return to the job site with the items, and/or coordinate with the homeowner for payment of the purchased items. Such offsite trips to obtain these items frequently result in unwanted delays, inefficiencies, and other undesirable consequences. Moreover, the process is manual and often involves subjective determinations based on incomplete information (e.g., selection of which store to use without knowledge of which stores have the items and at what prices) and unknowns (e.g., whether the contractor's vehicle can fit/carry the items, how many trips will be required, etc.).

Individual supply retailer companies offer delivery services that do not adequately solve the problems of manual item delivery processes. The retailers offer customers the ability to purchase an online order for delivery, usually next day delivery. To use such a service, the customer must often subjectively select a retailer based on incomplete information and unknowns (e.g., selection of the retailer without knowing whether the retailer's closest store location is more convenient than store locations of other retailers and how the selected retailer's prices compare to those of other retailers). Such systems do not compare retailers with respect to store location, item availability, and/or item price and thus do not enable the automated selection of an appropriate or best suited fulfillment center. Such systems also do not provide the ability to coordinate one or more deliveries that require items from stores of multiple, different retailers, for example, where no single retailer offers all of the items required for an order.

In addition, such retailer systems suffer from numerous deficiencies that make them ill-suited for the on-demand delivery (e.g., same day delivery, delivery within 2 hours, etc.) of items. Such systems generally use retailer resources for the delivery processes (e.g., store employees to collect order items and deliver those items, and store vehicles to delivery those items). However, such systems generally fail to coordinate the timely collection of items within the store and/or coordinate the timely delivery of the collected items to enable on-demand (e.g., same day or faster) delivery of items.

In addition, such retailer systems do not adequately facilitate approval of purchases or payment of items by persons other than the person placing the order and thus do not address the common burden (e.g., on contractors) to obtain purchase approvals, track expenses, and obtain payment from other persons (e.g., business owners, homeowners, etc.) after the fact.

In general, existing retailer systems do not enable an objectively-optimized process that can most efficiently and satisfactorily interact with the people that are involved in the on-demand delivery of items, such as construction workers, designers, architects, homeowners, one or more payers, in-store selectors (i.e., pullers), drivers (and their vehicles' capabilities), promotors/marketers, fulfillment center personnel, etc.

SUMMARY

Implementations of the invention disclosed herein provide systems and techniques for device-based coordination of multi-party delivery processes. Example implementations involve, at a device with one or more processors and a non-transitory computer-readable storage medium, coordinating payment for and delivery of items. For example, certain implementations involve a server that receives and sends electronic communications to devices used by contractors/architects (e.g., making purchases), homeowners/business owners/payers (e.g., providing payment information/approvals), retailers (e.g., offering items for purchase and pickup from fulfillment centers), pullers (e.g., collecting and completing checkout of the items at the fulfilment centers), drivers (e.g., pickup up the items at the fulfillment centers and driving the items to the delivery location), and/or others. The server can provide an objectively-optimized purchasing process (e.g., selecting retailers, fulfillment centers, pullers, and drivers and delegating tasks) to reduce order/item costs, efficiently use resources, provide fast delivery, and ensure the various parties are adequately notified of order details and status.

Certain implementations of the invention involve receiving a payer-invite request from a requester device. The payer-invite request requests an invitation be sent to a payer to pay for a delivery order. The delivery order specifies one or more items to be purchased and delivered to a requester location, e.g., to a location associated with the requester device or inputted by the requester. In one example, the payer-invite request is created based on input on the requester device on an app and identifies a phone number (or other device/account identifier) of the payer. The process itself, as well as the user interface of the app used in the process, are tailored to facilitate an easy and convenient process for the user. For example, in the circumstance of the payer-invite request including a payer phone number, the system sends the invitation by sending a text message to the phone number. The text message can include a selectable link for downloading and/or accessing the device app to view the delivery order and/or provide payment for the delivery order.

Certain implementations of the invention involve sending an invitation to a payer device associated with the payer and receiving a payment from the payer device in response to the invitation. The payer accesses the order, e.g., via an app on the payer's device, and provides payment information. For example, the payer may access (or create) an account (e.g., an account that includes identity information and credit card or other payment information) and select a user interface button provided on a user interface of the app to pay for the order using the account's payment information. In some implementations, the system sends a confirmation to the requester device that confirms that the payment was provided by the payer for the delivery order. In one implementation, once credit card payment information is provided, the system puts a hold on the card for the total amount (e.g., items, fees, taxes, etc.). Once the puller completes the shopping at a fulfillment center and hands the materials to the driver, the system charges the card.

In addition to, or as an alternative to, requesting payment information, the invitation may ask for an item selection from the receiving party. For example, the payer may be asked to select one or more particular items for the order. For example, an original delivery order entered by a contractor (e.g., on a requester device) may identify an item type (e.g., a refrigerator). The invitation, in this example, requests that the payer select a particular refrigerator model and provide payment for the order. The payer accesses the order, e.g., via an app on the payer's device, views a user interface item providing available options for the item selection, and provides input selecting a particular item, e.g., a particular model refrigerator, and the delivery order is modified accordingly. The payer also uses the app to provide payment information, for example, by selecting a user interface button to pay for the order using the payer's account's payment information.

Certain implementations of the invention use predetermined criteria to identify a fulfillment center, a puller, and/or a driver for a delivery order. These selections are made using objective criteria to improve the efficiency of the delivery process, e.g., to enable fast, on-demand delivery, or to otherwise improve the process. In one example, the server identifies a fulfillment center associated with a merchant (e.g., a retailer) based on a fulfillment center location of the fulfillment center, the requester location, and/or other criteria. In one example, selecting the fulfillment center involves accessing a dataset to determine that the one or more items are in stock at the fulfillment center. In another example, selecting the fulfillment center involves identifying that fulfilling the order at the fulfillment center would require less than a particular driving time (e.g., within 30 minutes driving time: from driver current location to fulfillment center to requester/delivery location). If there are multiple fulfillment centers that satisfy the driving time criteria and that have all of the items, a fulfillment center offering the best order price can be selected. In one implementation of the invention, the system identifies a set of candidate fulfillment centers with associated order costs and expected delivery times and presents options (e.g., on the app UI) to the requester or payer that allow that party to select the option that provides the costs/expected delivery time combination that best suits that party's needs and preferences. Similarly, if multiple fulfillment centers must (e.g., because no single one has all of the items) or can (e.g. not required but could do so to obtain a lower total order cost) be used to fulfill a single order, options can be presented to the party that allow the party to select a fulfillment center combination with associated costs and estimated delivery times that best meets his or her needs and preferences.

Certain implementations of the invention identify a puller based on a requester location and/or the fulfillment center location. In one example, the system identifies the puller based on a time capacity of the puller to perform activities required by the pulling instructions in a time period required for the delivery order. Once identified, the system sends a pulling instruction to a puller device. The pulling instruction instruct the puller to collect the one or more items of the delivery order at the fulfillment center.

Certain implementations of the invention identify a driver based on a requester location, the fulfillment center location, the driver's current location, and/or other criteria. In one example, the server identifies the driver based on a time capacity of the driver to perform activities required by the driving instructions in a time period required for the delivery order. In another example, the server identifies the driver based on a vehicle capability of a vehicle associated with the driver and vehicle requirements required for the delivery order. Such vehicle requirements are determined based on the dimensions of the one or more items, the weight of the one or more items, other characteristics of the one or more items, the weather conditions, the transportation route (e.g., road conditions, etc.), and/or delivery conditions (e.g., roads accessible by limited truck size, four wheel drive required, etc.). In one example, the vehicle requirements require that the vehicle include a dolly, lift-gate, a truck bed, a roof, or an additional person to lift the one or more items. The vehicle capability is determined based on input provided by the driver on the driver device, e.g., based on the make, model, dimension, and/or capacity information provided by the driver. Once identified, the system sends a driving instruction to a driver device. The driving instructions instruct the driver (e.g., based on acceptance of the driving project) to pick up the one or more items of the delivery order at the fulfillment center and deliver the items to the requester/delivery location.

Certain implementations of the invention send a communication to purchase the one or more items from the merchant with pickup at the fulfillment center. This communication can (but does not necessarily) provide payment information to the merchant.

Certain implementations of the invention send targeted communications with selected information to enable efficient communications and improve/minimize the burden upon the network, the devices, and the parties involved.

BRIEF DESCRIPTION OF THE FIGURES

These and other features, implementations, and advantages of the present disclosure are better understood when the following Detailed Description is read with reference to the accompanying drawings.

FIG. 6A is a block diagram illustrating an example user interface for creating an order for approval.

FIG. 6B is a block diagram illustrating an example user interface for selecting an approver.

FIG. 6G is a block diagram illustrating an example user interface identifying order activity—Status: Denied.

FIG. 6H is a block diagram illustrating an example user interface for viewing the order.

DETAILED DESCRIPTION

Figure 1:
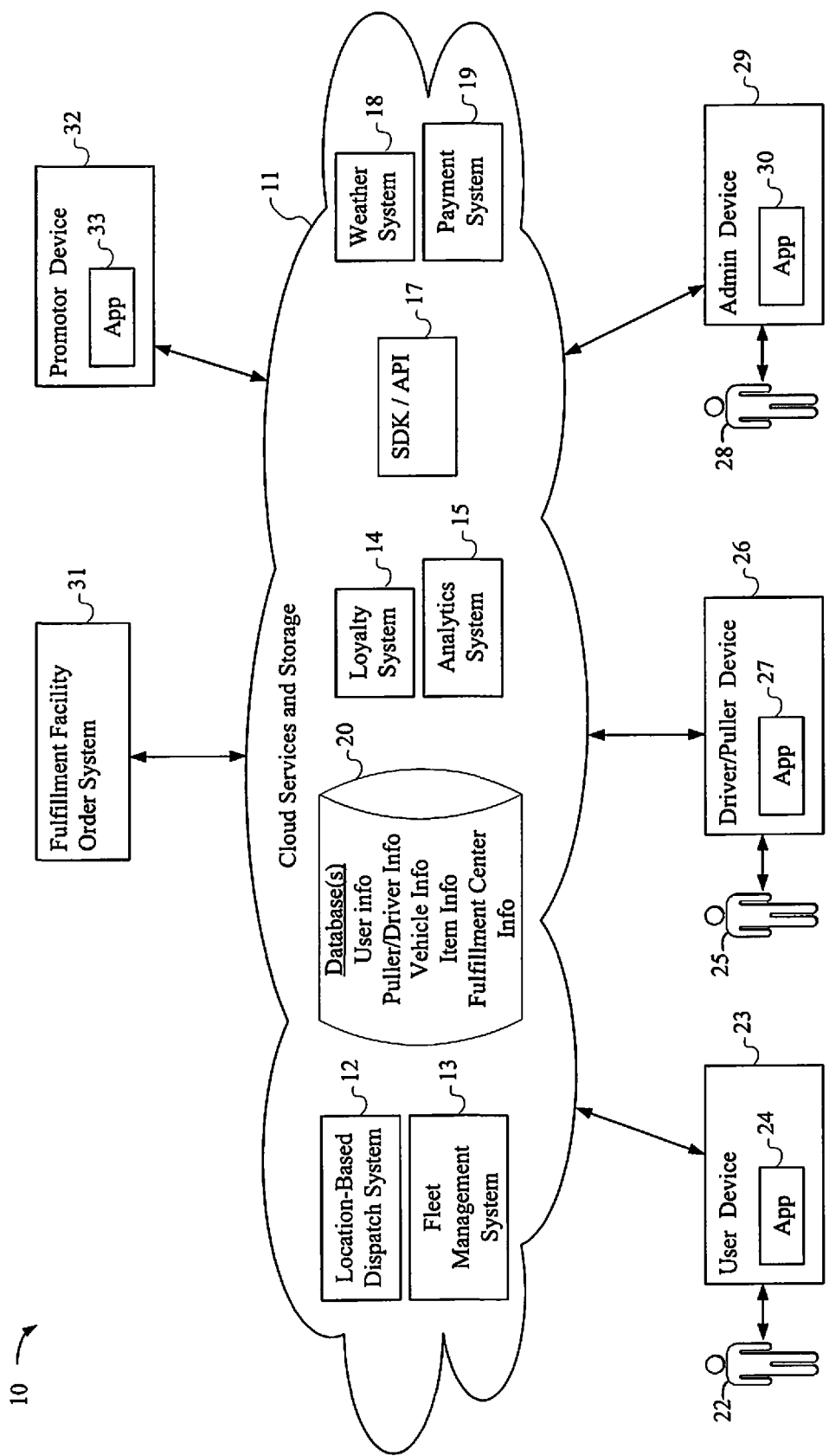
FIG. 1 is a block diagram illustrating an exemplary computing environment in which systems and techniques of the invention can be implemented.

As described above, existing computing systems fail to provide adequate on-demand delivery of items in many circumstances. Implementations of the invention provide systems and processes that enable on-demand delivery of items using the mobile and other devices used by the individuals involves in the processes. The devices are used to communicate with those individuals, to present easy-to-use and efficient user interfaces to those individuals, and to identify their locations. The system communicates with the consumers (i.e., the item selecting users), the payers (i.e., the payment providing users), the facilities that offer the items for purchase and pickup, the pullers that collect items in the fulfillment facilities, and/or the drivers that load, deliver, and/or unload the items. The locations of these people/entities are used to efficiently provide the on-demand delivery services. For examples, the locations of purchasers, pullers, and drivers can be tracked by the mobile phones used by those individuals. The system uses the locations of a fulfillment facilities, the locations of the job sites (identified from the users' devices), the locations of the pullers, and/or the locations of drivers to efficiently coordinate on-demand delivery. The system can additionally, or alternatively, account for other information to enhance the on-demand delivery services. For example, the system can track or access item characteristics (e.g., dimensions, weight, etc.), user characteristics (e.g., credit card info, etc.), puller characteristics (e.g., speed metrics and statistics, etc.), driver characteristics (e.g., vehicle type, vehicle capacity, vehicle equipment, helpers, etc.), and/or store characteristics (e.g., item availability, item prices, wait times, return policy, hours of operation, etc.). This information is used to select appropriate fulfillment facilities, pullers, and drivers for the deliveries. The system coordinates the deliveries by sending notifications (e.g., text messages, e-mails, in-app messages) to those facilities, pullers, and drivers with instructions and other information about the orders. Similarly, the system provides information to the users (e.g., those who select and pay for the items) about their orders, e.g., providing expected delivery times, notifications of issues, and tracking capabilities. The information that is provided by the system is displayed on the devices of the users in user interfaces that are tailored to provide an efficient and easy-to-use experience.

In one implementation of the invention, a computing system receives an order for a user for the delivery of items to a particular job site. The system uses the identities of the items and the location of the job site to automatically identify one or more appropriate fulfillment locations (e.g., stores that have the appropriate items in stock and/or at the best prices that are near the job site). The system further identifies, allocates, and implements resources that collect the items at the fulfillment center and then deliver those items to the job site. For example, the system may select a person (e.g., a puller) already located at the facility and send that person instructions to collect the items for the order. The system may also select another person (e.g., a driver) located nearby who will drive to the fulfillment center, load the items, drive to the job site, and unload the items at the job site. The system thus can automatically (or semi-automatically) identify and coordinate use of appropriate facility locations and personnel resources to complete the delivery.

In such on-demand delivery processes, the system is able to account for specific information about the order to efficiently use available resources. The system tracks attributes of items such as the dimensions, weight, special handling requirements, etc. of each of the items and uses this information to identify the puller and/or driver/vehicle that will be used. For example, the system may identify a driver of a vehicle that can handle loads from 2000 to 4000 pounds based on determining that the items in a user's order total 3000 pounds. To do so, the system tracks and uses information about the drivers/vehicles such as each vehicle's weight carrying capacity, size-capacity (e.g., bed size), lift gate attributes, equipment (e.g., dollies, etc.), and other resources (e.g., additional persons on-board for heavy loads). Thus, when selecting a driver/vehicle, the system can select a vehicle having the best location and attributes, e.g., the driver/vehicle with appropriate capacity and equipment that is nearest (or at least within a threshold distance of) the fulfillment center.

FIG. 1 is a block diagram illustrating an exemplary computing environment 10 in which systems and techniques of the invention can be implemented. In this example, the on-demand delivery system is implemented using cloud services and storage system 11 that communicates via a network such as the Internet with user devices, such as user device 23, driver devices and puller devices such as driver/puller device 26, and admin devices such as admin device 29.

The devices 23, 26, 29 each include an app 24, 27, 30 that communicates with the cloud services and storage system 11 to coordinate on-demand delivery services. For example, a user 22 may register by creating a user account using a user interface on the app 24 (e.g., by providing first name, last name, e-mail address, phone number, and image) and by confirming the account by responding with information provided in a targeted text message sent using the provided phone number. After registering, the user 22 is able to use the user interface provided by the app 24 to search for items to purchase (e.g., nails, screws, lumber, a hammer, drills, etc.) and create an order for the purchase and delivery of those items. In one example, this user 22 has provided credit card or other information that is used to purchase the items. In another example, this user 22 identifies another user for approval, editing, and/or payment of the order. For example, if the user 22 is a contractor, he or she can identify the homeowner (e.g., by providing the homeowner's phone number) as the payer/approver of the order. That homeowner/user can register/login in a similar manner using his or her own device and approve and pay for the order using an interface on that device.

Multiple payers (e.g., where costs will be split) can be identified. In one example, a promotor is identified to pay for all or part of an order. For example, a company that makes and sells Brand X drills or other promotor may offer a $10 delivery coupon applicable to the purchase of one of the drills. In this example, the cloud services and storage system 11 communicates with both the consumer payer and the promoter (e.g., on promotor device 32 using app 33). The promotor (and any other payer) can configure its device to automatically approve such promotions, e.g., automatically authorizing payment of a $10 portion of the charge.

After receiving an order, the cloud services and storage system 11 identifies an appropriate fulfillment center (e.g., a facility associated with fulfillment center order system 31) and appropriate resources (pullers, drivers, etc.) to complete the delivery. The cloud services and storage system 11 communicates with the appropriate fulfillment center order system 31 and driver/puller device(s) 26. For example, payment information (e.g., tokenized payment information derived from the payer's credit card info) can be sent to the fulfillment center order system 31 and/or detailed order information or instructions can be sent to the devices used by the puller and the driver. The puller's information can identify the particular items, quantities, in-store locations, customer-specific instructions, the driver's identity/contact info, the driver's expected arrival time, a specific pickup location at the facility, and/or other relevant information. The driver's information can identify the facility location, the particular pickup location at the facility, the puller's identity/contact info, the job site/delivery location, delivery instructions, the customer's name/contact information, etc. The puller, driver, and users involved in the delivery can access help by accessing an administrator 28 who is available to help resolve issues. For example, if a fulfillment center runs out of an ordered item after an order is placed but before the puller retrieves the item in the store, the administrator 28 can use app 30 on admin device 29 to identify an acceptable alternative at the store or coordinate pickup of the ordered item from another facility.

In this example, the on-demand delivery system implemented in the cloud services and storage system 11 includes a location-based dispatch system (LBDS) 12, a fleet management system 13, a loyalty system 14, an analytics system 15, a software development kit/application programming interface (SDK/API) 17, a weather system 18, and a payment system 19. While these features of the on-demand system are illustrated as separate engines or modules in this example, in alternative implementations one or more of these engines or modules could be combined with other engines or modules, altered, enhanced, or omitted. The cloud services and storage system 11 also includes one or more database(s) 20 that collect and store user information, puller information, driver information, vehicle information, item information, fulfillment center information, and/or other relevant information.

The location-based dispatch system (LBDS) 12 determines, for each order, an appropriate facility or facilities, an appropriate puller or pullers, and/or an appropriate driver or drivers. The LBDS 12 can make determinations automatically, semi-automatically, or manually using information about the users, pullers, drivers, vehicles, items, fulfillment facilities, etc. stored in the database(s) 20. For example, the LBDS 12 can automatically identify a fulfillment center within a threshold distance of the job site (e.g., within 5 miles of the location of the user's mobile device that placed the order) that has the ordered items currently available. In one example, the LBDS 12 identifies the closest store having all the items of the order. In another example, the system considers all of the stores within a predetermined threshold (distance or expected travel time) that have all of the ordered items and selects the store of those stores that offers the lowest total price for the items. In another example, the system selects the fulfillment center based on alternative and/or additional criteria such as customer preferences, facility wait times, facility hours of operation, accessibility of the facility with respect to pick-up (e.g., has loading dock, etc.). The LBDS 12 provides information about the order (e.g., payment information) to the facility.

The LBDS 12 additionally or alternatively identifies resources such as pullers and drivers for the individual deliveries. The puller for a delivery, for example, can be selected based on location (e.g., if already at or near the facility, etc.), the puller's status (e.g., availability/capacity to perform puller duties during relevant time-frame, etc.), and/or the puller's expertise/statistics (e.g., selecting an electrical specialist to pull electrical items for an electrical job). The driver for a delivery, as another example, can be selected based on vehicle (e.g., having appropriate weight capacity, etc.), location (e.g., selecting the closest available driver with an appropriate vehicle), expertise (e.g., landscaping, electrical, appliance installation, etc.).

The LBDS 12 provides information and instructions about the orders/deliveries to the pullers and drivers. For example, the LBDS 12 may send notifications in the apps used by the puller and driver on their mobile devices. The information may include specific time requirements based on a delivery process schedule determined by the LBDS 12, e.g., notifying the puller to pull the items and have the items at the pickup location by 1:30 and notifying the driver to pick-up the items at that location at 1:30. The LBDS 12 can then track status information with respect to the puller and driver activities, address issues as they arise, and notify the users that placed the order of up-to-date expectations (e.g., sending a notice that "your delivery is expected by 2:00", etc.). Once delivered, the LBDS 12 can request confirmation from the driver and/or notify the user that delivery was completed (e.g., via in-app notifications and input).

The LBDS 12 can make its facility, puller, and/or driver selections using algorithms and/or artificial intelligence. In one example, the LBDS 12 trains a neural network to receive order information (e.g., item SKUs, quantities, delivery location etc.) and resource information (e.g., facility attributes, puller attributes, and/or driver attributes) and to output facility, puller, and driver selections that optimize system resource usage.

Vehicle-Capacity Based On-Demand Delivery Techniques

Techniques of the invention enable on-demand delivery of items that have varying dimensions, weights, quantities, and combinations of items. Such deliveries can require vehicles having particular capabilities. Techniques of the invention enable a fleet and/or crowd-sourced collection of vehicles of varying capabilities to be used to perform deliveries having a variety of different capacity requirements. To do so, the on-demand delivery system tracks item characteristics (e.g., item weight, item dimension, item special handling requirements, etc.) and determines vehicle capability requirements for each order accordingly. In one example, the system simple determines a total weight of an order and selects a vehicle capable of supporting that weight. In another example, the system determines dimensional requirements for an order (e.g., that a refrigerator requires a minimum space, that the accompanying 16 foot 2×4 lumber requires a particular length truck bed, etc.).

Generally, the system is able to select an appropriate driver/vehicle combination based on the vehicle's capacity being sufficient for the order's weight and/or dimensions, the location of the vehicle (e.g., known from location tracking enabled on the driver's mobile device or a tracker in the vehicle itself), the pick-up/fulfillment center location, the delivery/jobsite location (e.g., known from the requester's location), the time constraints for the order, and any other appropriate information. Moreover, the selection of driver/vehicle can be part of a larger optimization that considers multiple orders, multiple drivers/vehicles, multiple fulfillment centers, and other criteria all together to identify optimal selections.

These selections can consider maximizing revenue, minimizing delivery time, and/or other criteria as objectives. For example, if fixed fees are charged for deliveries of orders within particular weight thresholds, the system can select resources (drivers/vehicles, pullers, fulfillment centers, etc.) that minimize the costs of providing the delivery service (e.g., minimizing the combined cost of driver time, puller time, vehicle time, gas required, and/or minimizing route distances, etc.).

Consider an example in which a contractor orders 25 eight foot long 2×4 pieces of lumber, 5 gallons of paint, and a small refrigerator. In this example, the system identifies that there are 10 vehicles within 2 miles of a nearby fulfillment center that has these materials. The system compares these drivers/vehicles to select an appropriate selection. In this example, 3 of the vehicles are too small to carry the refrigerator and 2 of the other vehicles do not have adequately long truck beds for the lumber. Of the remaining 5 vehicles, all 5 are capable of handling the order but 2 of the 5 are much bigger and thus more expensive to fuel and operate than the remaining 3 vehicles. The system considers the 3 remaining more efficient vehicles and selects the vehicle that is the closest to the fulfillment location. This example is presented merely to illustrate one method of selection. In practice, the system is implemented to consider and balance criteria to select an appropriate driver/vehicle and can take into account additional and/or different criteria. For example, the system could additionally consider whether the vehicles have helpful dollies, additional riders/helpers, and/or other features useful for a particular delivery.

The delivery process can involve use of a fleet of vehicles, where the vehicles are owned, maintained, and operated by a single entity such as the entity that provides the on-demand delivery service. In this example, fleet information is managed by the system and used to facilitate the vehicle-capability based vehicle selections. Drivers of the fleet may be managed in fixed-shift schedules (e.g., 4 hour shifts) to reduce the complexity of the system and reduce the risk of driver's vehicles being taken out of service at an unexpected time. In the context of a crowd-sourced collection of drivers/vehicles, the information about the vehicles is provided by the drivers who must register with the service. For example, a registering driver may be required to identify his or her particular vehicle's make, model, year, capacity information, provide a vehicle photo, and/or submit his or her vehicle for inspection and/or verification of capabilities. Fleet drivers preferably do not have flexibility to accept or decline assigned jobs during their shifts. In another implementation drivers do have flexibility to accept or decline jobs via options presented on the user interfaces of the apps on their mobile devices. This simplifies processing and/or helps ensure optimal performance and efficiency. In one implementation of the invention, drivers are assigned roles and/or specialties, e.g., light loaders, heavy loaders, electrical expertise, etc., and those roles are used in selecting drivers/vehicles for particular delivery projects.

The system can additionally or alternatively be configured to account for other factors, such as weather, in selecting a driver vehicle. For example, if it is raining, the system can select closed vehicles for delivery of appliances and/or other items that require protection from the rain.

In one implementation of the invention, the system provides a crowd-sourced model that sources drivers of pickup trucks having varying capabilities. In this model, the system allows independent pickup truck owners to join as drivers and/or pullers. The drivers may be required to pass certain background checks and/or Department of Transportation (DOT) requirements. This exemplary pickup truck-focused system solves a difficult logistical transportation problem by tapping into the underutilized pickup trucks that are idle at the homes of individuals and the parking lots of businesses.

Certain aspects of the processes are performed automatically and other aspects are interactive. In one example, an LBDS makes automatic determinations about items, stores, drivers, pullers, routes, and other attributes for a delivery process. The LBDS distributes notifications based on these determinations. In one example, the LBDS is configured to send notifications to the puller apps and the driver appls with instructions and other information based on those determinations. The pullers and drivers interact with the provided information, for example, to confirm receipt of the information and/or to confirm accuracy (e.g., whether the items are actually available on the shelf or not or whether the price is as expected or not, etc.).

The LBDS is a liaison between the customer and the fleet, company, and/or individuals that are providing the on-demand delivery services. In this example, the LBDS assesses the order size of each order, for example, determining which type of vehicle is needed, how many vehicles are needed, etc. based on the dimensions and/or weight of the items ordered. If more than one truck load is required, the customer may be contacted, for example, to approve an additional charge.

The LBDS further checks the delivery address/location and finds an appropriate fulfillment center. The selection can be based on its proximity to the job site/delivery location, the location of pullers, and/or the location of the drivers. The LBDS also confirms that the items are available in the selected fulfillment center. If not available, another fulfillment center is selected. The LBDS identifies appropriate pullers and drivers and sends the customer information about the delivery (e.g., name, delivery address, selected fulfillment center, etc.). The LBDS also sends order details to the puller(s) and driver(s), for example, providing the order number, product name, and product description. The LBDS further updates the status of the filling, connects with the driver to confirm order quantity and expected time of arrival (ETA) at the drop off location, and sends a delivery ETA to the customer.

The puller, which will typically be a person, robot, or drone, checks the system for order details and starts pulling each order when it arrives or when the puller becomes available. If there are any discrepancies in the order details, the puller sends a communication to the LBDS (e.g., not enough quantity in stock, wrong price, etc.). The puller collects the items and proceeds with checkout. The puller double checks the order details versus the pulled items and/or takes pictures of the items and/or the receipt. The puller waits for a confirmation from the LBDS before leaving the fulfillment center. If no other orders are in the queue, the puller may be instructed to help load the ordered items on the driver's vehicle.

The driver, which will typically be a person but could be a self-driving vehicle, robot, and/or drone, opens a driving navigation app and sets the delivery address. The driving navigation app selects an appropriate route based on the address and provides an ETA to the LBDS. The driver also communicates with the puller on premises with respect to the order. The driver loads items onto the vehicle, receives confirmation from the LBDS before leaving the fulfillment center, arrives at the job site and notifies the LBDS, unloads at the site, takes a picture of the final drop-off/load and/or turns the items over to the customer.

Figure 2:
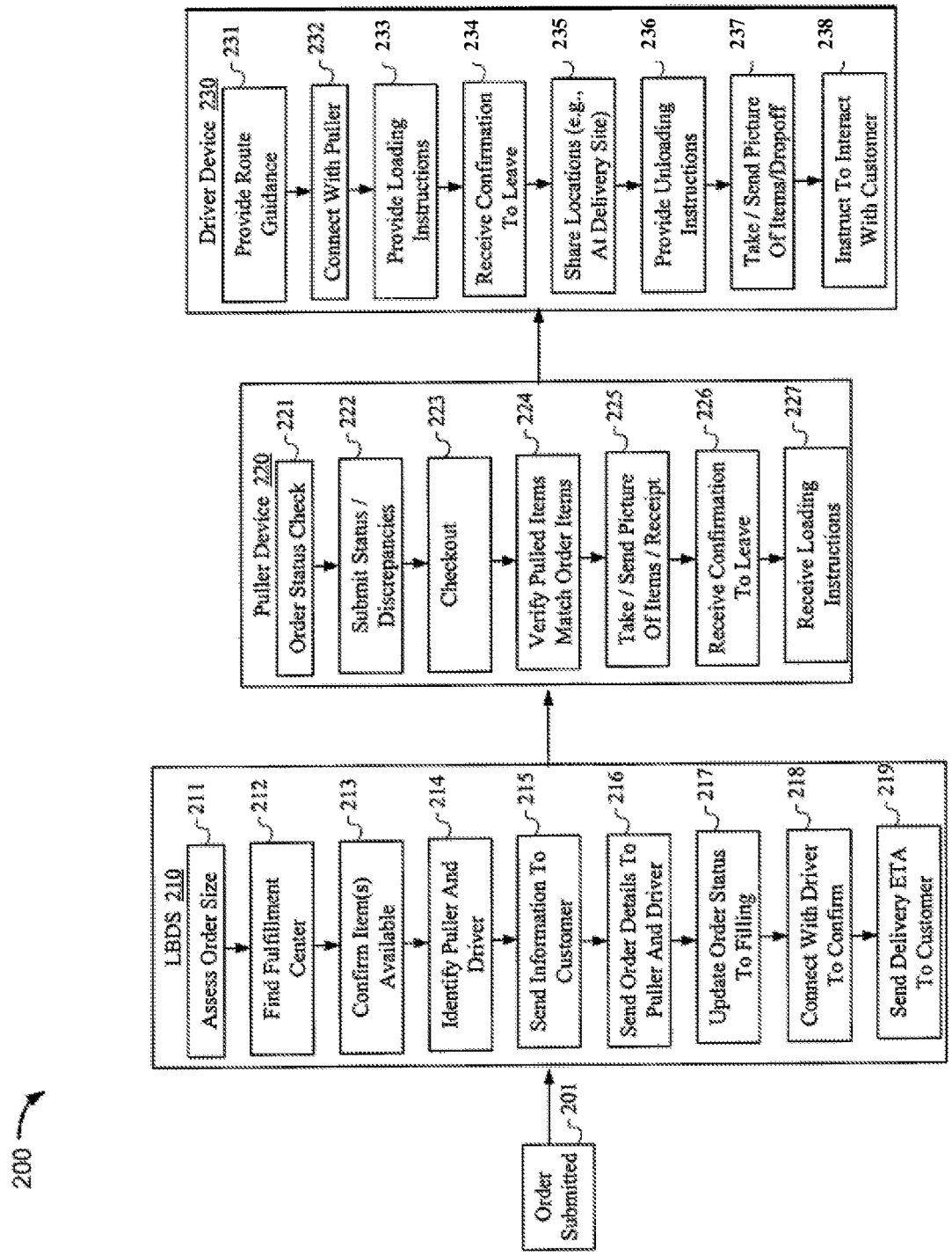
FIG. 2 is a block diagram illustrating example processes performed by a an LBDS, a puller device, and a driver device.

FIG. 2 is a block diagram illustrating example processes performed by a an LBDS 210, a puller device 220, and a driver device 230. In this example the LBDS 210 receives an order that is submitted by a requester. The LBDS 210 assesses the order size (e.g., number of items, weight of items, dimensions of items, etc.) at block 211 and finds a fulfillment center 212 that can provide the items. For example, the LBDS 210 can identify a fulfilment center based on expected delivery time given the locations of the customer/requester and/or potential drivers, based on the availability of the items at potential fulfillment centers, based on the cost of the items as the potential fulfillment centers and/or based on the availability of pullers at the potential fulfillment centers. The LBDS 210 confirms that the item(s) are available at the fulfillment center at block 213, e.g., by sending a request or order to the fulfillment center. The LBDS identifies a puller and/or driver, at block 214, if not already identified as part of the fulfillment center selection.

The LBDS 210 sends information to the customer/requester at block 215, for example, confirming that the order is scheduled, identifying the fulfillment center, identifying the driver, providing an estimated delivery time, etc. The LBDS 210 sends order details to the puller and driver at block 216. The order details sent to the puller can include instructions to the puller to obtain/collect the items at the fulfillment center. The order details sent to the driver can include instructions to the driver to pick up the items at the fulfillment center and deliver the items to the customer/requester location. The LBDS 210 updates the order status to "Filling" at block 217. The LBDS 210 connects with the driver to confirm the delivery order at block 218. For example, the driver can be sent a notification or message requesting acceptance of the delivery project and, upon input on the driver's device 230, an acceptance can be sent back to the LBDS 210. The LBDS 210 sends a delivery estimated time of arrival (ETA) to the customer/requester at block 219.

The puller device 220 performs an order status check at block 221 and submits status/discrepancies at block 222. In one example this involves submitting a status such as "not started," "in-progress," "completed," or a discrepancy such as "item/material not available," "price different than expected," "expected/needed quantity not available," or "item condition issue." In one implementation, the puller device 220 captures an image of an item and that image is provided with a submitted status or discrepancy. For example, if all of the eight foot long 2×4 lumber at the fulfillment center is warped, the puller device 220 can capture an image of the lumber stack that is provided with an "item condition issue" discrepancy. In some implementation, status is determined using electronic-based item identification, sensors, and/or detection technology.

The puller device 220 may receive data using a sensor to identify an item, capture an image of a bar code on an item, and/or read, a near field communication (NFC) identifier, and/or radio frequency identification tag (RFID tag). This item identification information can be received/identified at the time the puller puts the item in the puller's cart and/or at other times as the puller locates, retrieves, moves, checks-out, hands-off, or otherwise interacts with the items. In one example, a camera or other sensor on the puller device 220 captures an image of an item and an item identification algorithm or artificial intelligence/neural network on the puller device 220 (or on a separate device) identifies the type of the item, attributes of the item, the quantity of items, etc. In one example, the puller device 220 receives or identifies item identifying information and/or determines the location of the puller device (e.g., in an aisle of the fulfillment center rather than at checkout or outside the center). Based on the information and/or puller device location, the puller device 220 determines to send a status message, e.g., identifying the particular item and the status of the pulling process, e.g., that item has been pulled by the puller.

The puller device 220 performs checkout at block 223. In some implementations, checkout involves the puller physically completing a checkout process with a cashier or automated checkout system ringing up the pulled items and presenting a total charge for those items. The puller device 220 can detect the items as they are rung up by the cashier or automated system, for example, by reading bar codes, NFC identifiers, or RFID tags on the items. In some implementation, the puller device 220 interacts electronically (e.g., via WiFi or Bluetooth technologies) with a checkout device at the facility, e.g., as the cashier rings up each item, the puller device 220 receives an electronic communication that identifies the item that was rung up. The puller device 220 uses information about items that are rung up during checkout to keep track of the pulling status. For example, the pulling device 220 can maintain a list of items to be pulled for an order and check off corresponding items as they are rung up. The puller device 220 can notify the LBDS 210 and/or driver device 230 of the status of individual items. In another example, the puller device 220 receives price information for the items as they are rung up, checks for discrepancies (e.g., rung up price more than price expected, etc.), and takes appropriate action. For example, upon detecting a price discrepancy, the pulling device 220 may display a notification to the puller via the app to challenge the price or otherwise address the issue. In another example, the puller device 220 additionally or alternatively sends a notification to the LBDS 210 regarding the discrepancy.

In an alternative implementation, checkout is facilitated by direct payment communications coordinated by the puller device 220. In one example, the puller device 220 transmits data to a fulfillment center device to provide payment information. For example, the user interface on the puller device 220 can include a pay button that the puller selects once all of the items are rung up. The puller device 220 then transmits credit card or other payment information or otherwise initiates an electronic payment to pay for the order. A receipt of the order can be received by the puller device 220, which can update the LBDS 210 with status information accordingly.

In another example, the puller device 220 additionally or alternatively takes and/or sends a picture or video of the items and/or of the receipt at block 225. Additionally, or alternatively, the LBDS 210 may receive a receipt, including price, item attributes, and payment confirmation directly from the fulfillment center device/system.

The puller device 220 verifies the pulled items match the order items at block 224. The puller device 220 can, for example, use one or more sensors to identify items and/or check the accuracy of the items (e.g., correct item number, bar code, quantity, attributes, etc.) based on information received from the fulfillment center device at checkout.

The puller device 220 receives confirmation to leave the fulfillment center at block 226. In one implementation, the puller device 220 receives instructions for the puller to leave the interior of the fulfillment center to meet the driver to provide the items to the driver and/or help load the items into the driver's vehicle.

The puller device 220 receives loading instructions at block 227, e.g., to meet the driver at a particular location at the fulfillment center, to help the driver with loading, time requirements, item alternatives, etc. In some implementations, the puller device 220 verifies the identity of the driver and/or the driver's vehicle. The loading instructions, for example, can include a description of the driver and/or the driver's vehicle, including the driver's name, driver's license number, driver photo, license plate number, the vehicle color, vehicle make and model, and other such information. Additionally, or alternatively, the puller device 220 can exchange information with or communicate with the driver device 230 in a handshake/handoff process that confirms the respective identities of the devices 220, 230. In one example, the driver device 230 displays a code (e.g., provided by the LBDS 210) that must be entered into the puller device 220 to authenticate the driver device (e.g., via communications with LBDS 210), or vice versa. In another example, the puller device 220 and driver device 230 verify the puller or driver respectively using biometric information, e.g., a fingerprints scan, an eye scan, a head scan, etc. For example, the puller device 220 can capture an image of the driver and confirm the driver's identify based on the image. In another example, the puller device 220 passes on an electronic certificate, a cryptographically secured identifier, and/or a block protected using block-chain technology that includes information about the puller activities, payment activities, and/or any other relevant information.

In another example, the puller device 220 and driver device 230 communicate directly with one another with minimal or no human interaction to verify their identities to one another. For example, the devices 220, 230 can exchange information via a wireless short range communication protocol such as those using RFID, Bluetooth, or near-field communication (NFC) technologies. The close range limitations of these communications can ensure the accuracy of the verification process, e.g., if the puller device 220 detects that the only driver device within communication range is the correct driver device 210 for the order, the driver device's identity is verified. If there are ambiguities (e.g., two drivers are parked outside the exit), the puller device 220 can prompt the puller to complete an additional verification process, e.g., confirming the driver's name, ID, license plate, etc.

Signatures provided by the puller and/or driver on their respective devices 220, 230 can be received and used to send notifications regarding status and/or further verify the correct identities of the puller and/or driver involved in the exchange. If at any point in the exchange a discrepancy is detected, the puller device 220 and/or driver device 230 can provide notifications locally, to the LBDS, and/or to a third party, such as a law enforcement officer or fulfillment center contact.

The driver device 230 provides route guidance at block 231. For example, the driver device may receive a fulfillment center location (e.g., street address, longitude/latitude, etc.) and use a mapping application or service to receive, display, and otherwise present route guidance to the driver. The driver device 230 connects with the puller at block 232. For example, apps on the puller device 220 and driver device 230 can communicate with one another via a wireless network to exchange text and voice message, and may provide a selectable option to initiate a phone call between the devices 220, 230.

The driver device 230 provides loading instructions at block 213, e.g., to meet the puller at a particular location at the fulfillment center, time requirements, loading requirements, etc. As the driver and/or puller load items into the driver's vehicle, the items can be detected and status updates provided to the LBDS 210. In some implementations, loading involves the driver and/or puller identifying each item as the item is physically loaded into the vehicle. In one example, a camera or other sensor on the driver device 230 captures an image of an item and an item identification algorithm or artificial intelligence/neural network on the driver device 230 (or on a separate device) identifies the type of the item, attributes of the item, the quantity of items, etc. In another example, the driver device 230 is configured to detect the items as they are loaded, for example, by reading bar codes, NFC identifications, or RFID tags on the items. In some implementation, the driver device 230 interacts electronically (e.g., via WiFi or Bluetooth technologies) with an in-vehicle scanner or other device. The driver device 230 uses information about items that are being loaded to keep track of status. For example, the driver device 230 can maintain a list of items to be loaded for an order and check off corresponding items as they are loaded. The driver device 230 can notify the LBDS 210 and/or puller device 220 of the status of individual items as those items are loaded. The driver device 230 additionally or alternatively sends a notification to the LBDS 210 regarding any discrepancies, e.g., identifying items that were purchased but not provided for pickup by the puller.

The driver device 230 receives confirmation to leave the fulfillment center at block 214, for example, with additional or specific instructions regarding delivery.

The driver device 230 shares its location at block 214. For example, the driver device 230 may automatically send notification to the LBDS 210 and/or puller device 220 based on the device determining that the device's current location matches the fulfillment center location. The driver device 230 provides unloading instructions at block 216. The driver device 230 takes and/or sends a picture or video of the items at drop off at the customer/requester location at block 217.

The driver device 230 instructs the driver regarding interactions with the customer/requester at block 218. For example, the driver device 230 can provide instructions regarding ringing the doorbell, going to a particular location (e.g., around back), information that should be explained to the customer (e.g., "keep the refrigerator upright for 24 hours before use").

In some implementation, block chain technology is used during the overall delivery process, e.g., during the pulling process, checkout process, payment process, loading process, delivery process, and/or unloading process. As one or more of these processes are completed using the various devices of the different users involved, the devices create new records, called blocks, which are linked and secured using cryptography. The blocks are linked to prior blocks in the chain. In one example, each block contains a cryptographic hash of the previous block, a timestamp, and transaction data. This design is resistant to modification and provides an open, distributed ledger of the events and transactions involved in the overall delivery process. In one example, an LBDS 210 sends a first block requesting payment information from a payer, receives a second block back including the first block information and the payment information, and sends a third block that includes the information from the first two blocks to the puller device 220. The puller device 210 provides a fourth block, including the information from the first three blocks, at checkout to a fulfillment center device to provide payment for the order. The fulfillment center device sends a fifth block, including information from the prior blocks in the chain and/or information about processing the payment, to a bank, payment center, and/or back to the LBDS 210.

Figure 3:
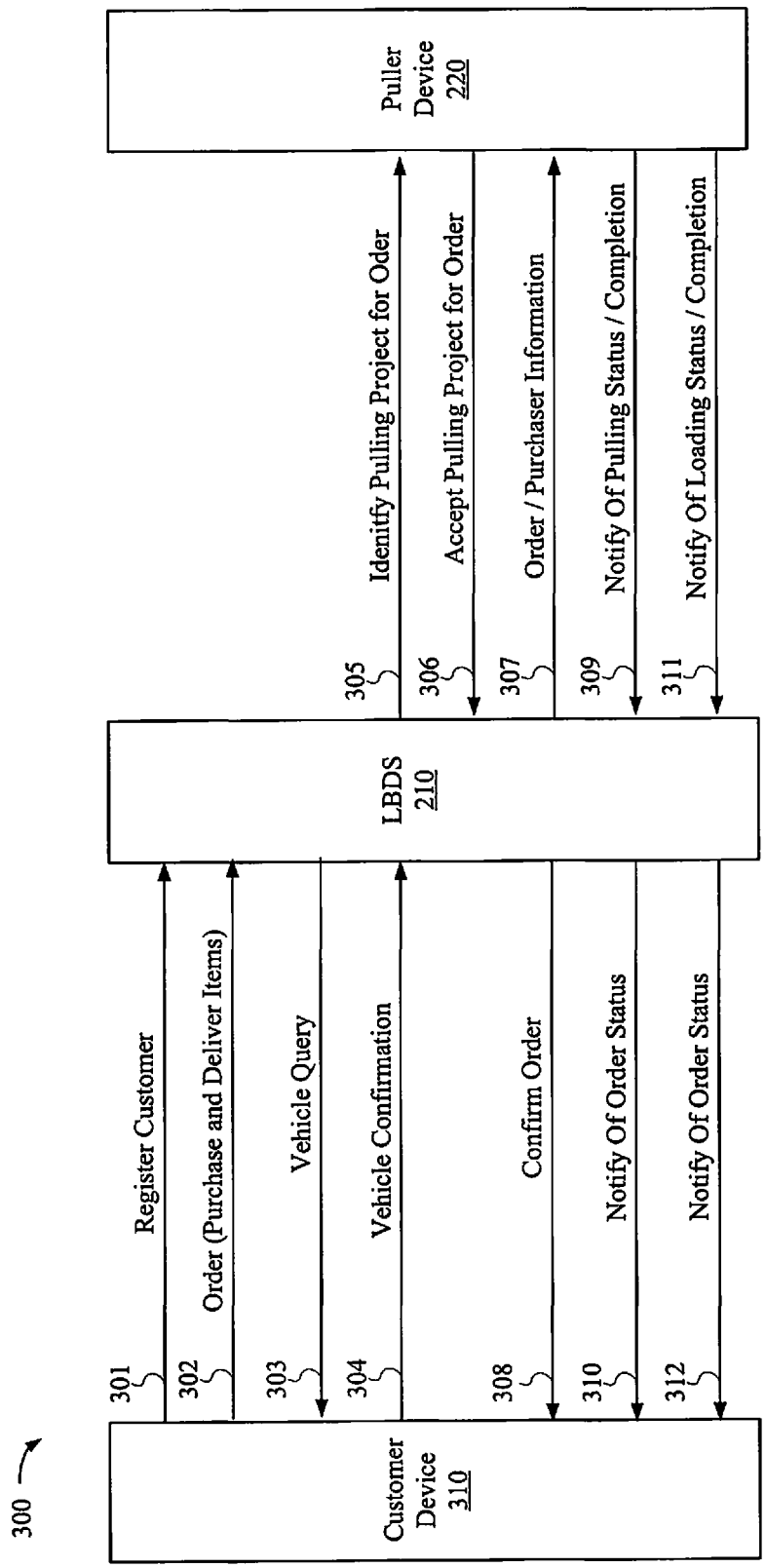
FIG. 3 is a block diagram illustrating example communications between an LBDS, a puller device, and a customer device.

FIG. 3 is a block diagram illustrating example communications 300 between an LBDS 210, a puller device 220, and a customer device 310. In this example, the customer device 310 (e.g., a smart phone of a contractor) sends a register customer message 301 to the LBDS 210. For example, the register customer message 301 may include a contractor's name, e-mail, cell phone number, address, login password, etc.

The customer device 310 sends an order message 302 to the LBDS 210 specifying an order for the purchase and delivery of items. The LBDS 210 optionally responds with a vehicle query 303 (e.g., asking for approval for an extra charge to use 2 vehicles based on the order attributes) and the customer device 304 responds, if needed, with a vehicle confirmation 304 (e.g., approving the extra charge).

After receiving the order and identifying a puller, the LBDS 210 sends a message 305 to puller device 220 of the puller that identifies a pulling project for the order. The puller device 220, based on input from the puller, sends message 306 accepting the pulling project for the order. The LBDS 210 sends a message 308 to the customer device 310 confirming the order and a message 307 to the puller device with order information, e.g., identifying the items to be collected, a pickup time, etc. As the puller pulls the items and completes the order, one or more messages 309 are sent to the LBDS 210 providing notice of the pulling status/completion. The LBDS 310, in turn, notifies the customer device 310. In an alternative implementation, the puller device 220 communicates directly with the customer device 310.

In some implementations, the puller will help load the items onto the vehicle of the driver. As the puller loads the items and completes loading of the order, one or more messages 311 are sent to the LBDS 210 providing notice of the loading status/completion. The LBDS 310, in turn, notifies the customer device via messages 312. In an alternative implementation, the puller device 220 communicates directly with the customer device 310.

Figure 4:
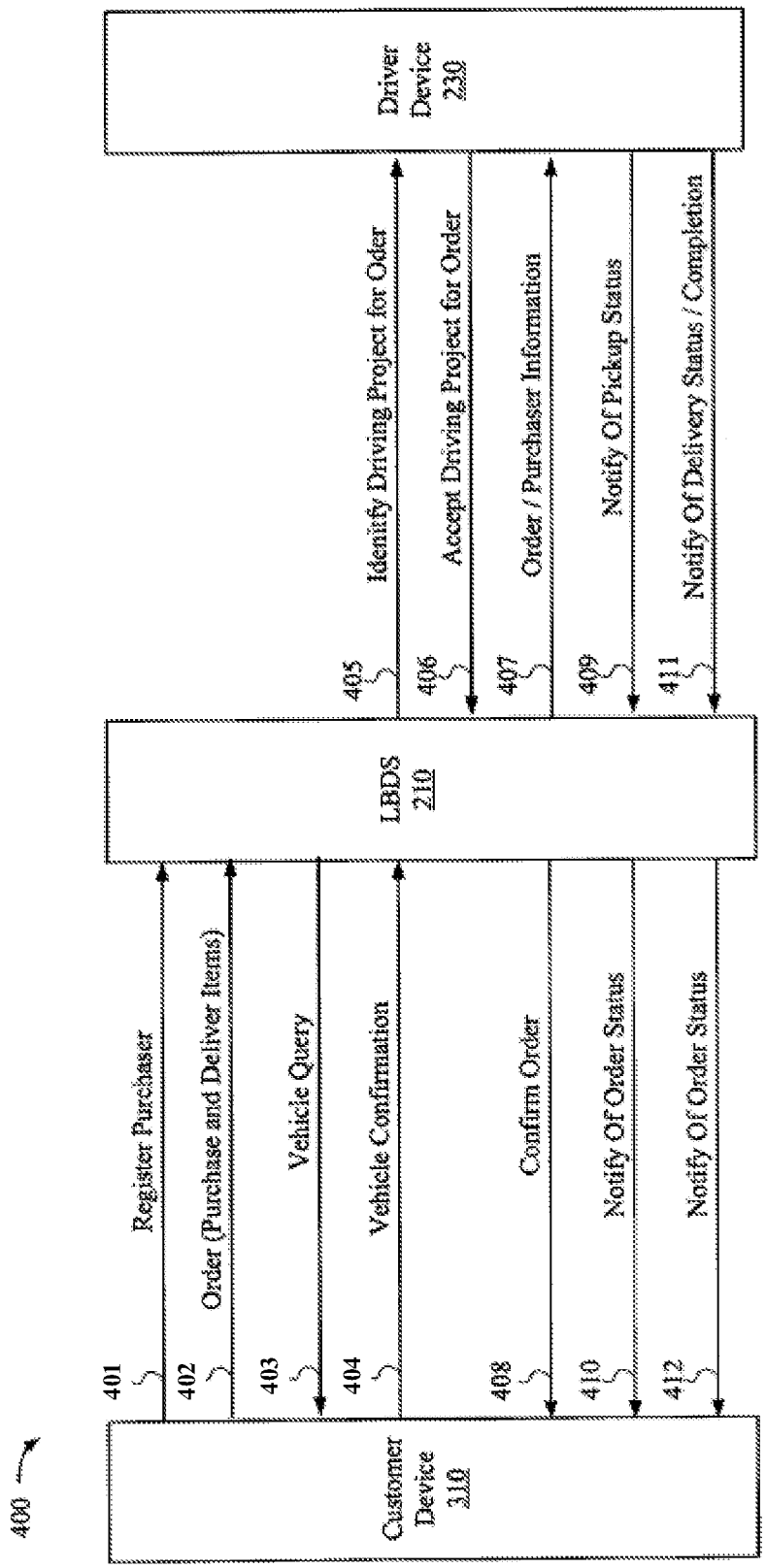
FIG. 4 is a block diagram illustrating example communications between an LBDS, a driver device, and a customer device.

FIG. 4 is a block diagram illustrating example communications 400 between an LBDS 210, a driver device 230, and a purchaser device 310. In this example, messages 301, 302, 303, 304 are the same as those described with reference to FIG. 3. The messages depicted in FIGS. 3 and 4 can, but need not, be coordinated into a single puller/driver coordination process in certain implementations.

After receiving the order and identifying a driver, the LBDS 210 sends a message 405 to driver device 230 of the driver that identifies a driving project for the order. The driver device 230, based on input from the driver, sends message 406 accepting the pulling project for the order. The LBDS 210 sends a message 408 to the customer device 310 confirming the order and a message 407 to the driver device with order information, e.g., identifying the items, a pickup time, a pick up location at a fulfillment center, a drop off location at a requester, etc. As the driver picks up the items and drives the delivery route, one or more messages 409 and 411 are sent to the LBDS 210 providing notice of the pickup status/completion and delivery status/completion. The LBDS 310, in turn, notifies the customer device 310 via messages 410 and 412. In an alternative implementation, the driver device 230 communicates directly with the customer device 310 via messages.

Multi-User Item Selection and Payment Techniques

Implementations of the invention provide an item delivery system that enables multiple users (using different devices and accounts) to participate in the selection of items and/or the provision of payments for the items. The system provides user interface features that allow one user to create an order and then invite one or more other users to participate. The system additionally facilitates the interactions by the user. For example, the system provides, in one example, a user interface to a first user that provides a user interface feature (e.g., a user interface control) that enables the first user to specify another party to approve/pay for an order. When this feature is selected by the first user, the system automatically initiates interactions with the second user to approve/pay for the order, e.g., by sending a notification to a device of the second user.

The system can be configured to coordinate various multi-party scenarios. In one example, a first user selects items for an order and selects another user to review and approve the order. The second user, in this example, is notified and only enabled to view the order and approve/deny the order. In a similar example, a first user selects the items for an order and selects another user to pay for the items. The second user is notified and enabled to view the order and provide for payment of the order, e.g., using a credit card account associated with the second user's profile account. In other examples, a first user selects items for an order and selects multiple other users to approve/pay for the order. The multiple other users are then notified and view the order and/or pay for some or all of the order. In another example, the first user selects the items for an order and selects one or more other users to pay for the items, for example, selecting a brand promotor to pay for $10 of the order per a promotion and inviting the homeowner to pay for the rest of the order.

Implementations of the invention additionally or alternatively enable multiple users to participate in selection of the items in the order. In one example, a first user can add lumber and nails to an order and then invite a second user to make an additional selection (e.g., of an appliance). In another example, the first user selects an item (or type of item) and invites the second user to select a particular item style or from a particular set of alternatives. As a specific example, the first user may select 40 square feet of ceramic tile and invite the homeowner to select which particular ceramic tile pattern will be used.

As illustrated in the preceding examples, techniques of the invention enable a new model for customer interaction and branding. A promotor is able to promote specific branded products by offering rules-based promotions. The rules are used to enable automatic interactions for certain situations, i.e., scenarios that satisfy the rules. For example, a rule can be set up to automatically provide a benefit whenever a particular branded item is added to a cart of items being selected for delivery. Thus, while the user is selecting and paying for the delivery of items, the brand is enabled to directly interact with the user (i.e., in the form of providing a benefit). Consider an example in which a liquid nails manufacturer creates a promotional campaign to automatically pay for some or all of the delivery of its liquid nails products ordered by customers using the delivery service. The promotion is implemented by allowing anyone who creates or edits an order containing the liquid nails item to identify the promotor as a payer (e.g., by entering payer number xxx-xxx-xxxx). When a user adds the item to the cart, the user receives a notification of the available benefit (e.g., "Add Promotor X as a payee to receive a 10% discount", etc.) The promotor's system is configured to automatically approve the payments when the requests come in. In one example, the payer configures a rules engine to automatically respond to payment request for orders containing their items by approving payments of a specified amount (e.g., paying the 10% promised by the particular promotion, etc.). In this example, the system allows the promotor to personify the brand and establish a direct connection with the consumer. Promotors are enabled to provide direct notifications, interactive offers, and other benefits based on the users actions in the order delivery process. Benefits offered by promotors can include, but are not limited to, payments for or discounts on items, additional promotional items, payments for or discounts on delivery charges, additional delivery services, and/or other types of traditional incentives.

Enabling multiple parties to participate in the selection and/or payment activities via their mobile electronic devices provides numerous advantages. It facilitates a quick and efficient process, improves the ability of the parties to understand and confirm the items being used in the project as well as the associated costs and available alternatives, and/or reduces the effort required on the part of the parties involved in reimbursing for purchases made on behalf of other parties. End customers are better informed and benefit from quicker completion times and more desirable/custom selected finishes, while contractors and workers are able to work more efficiently and with less worry of making undesirable item selections and having to collect for reimbursements after the purchases are made.

Figure 5:
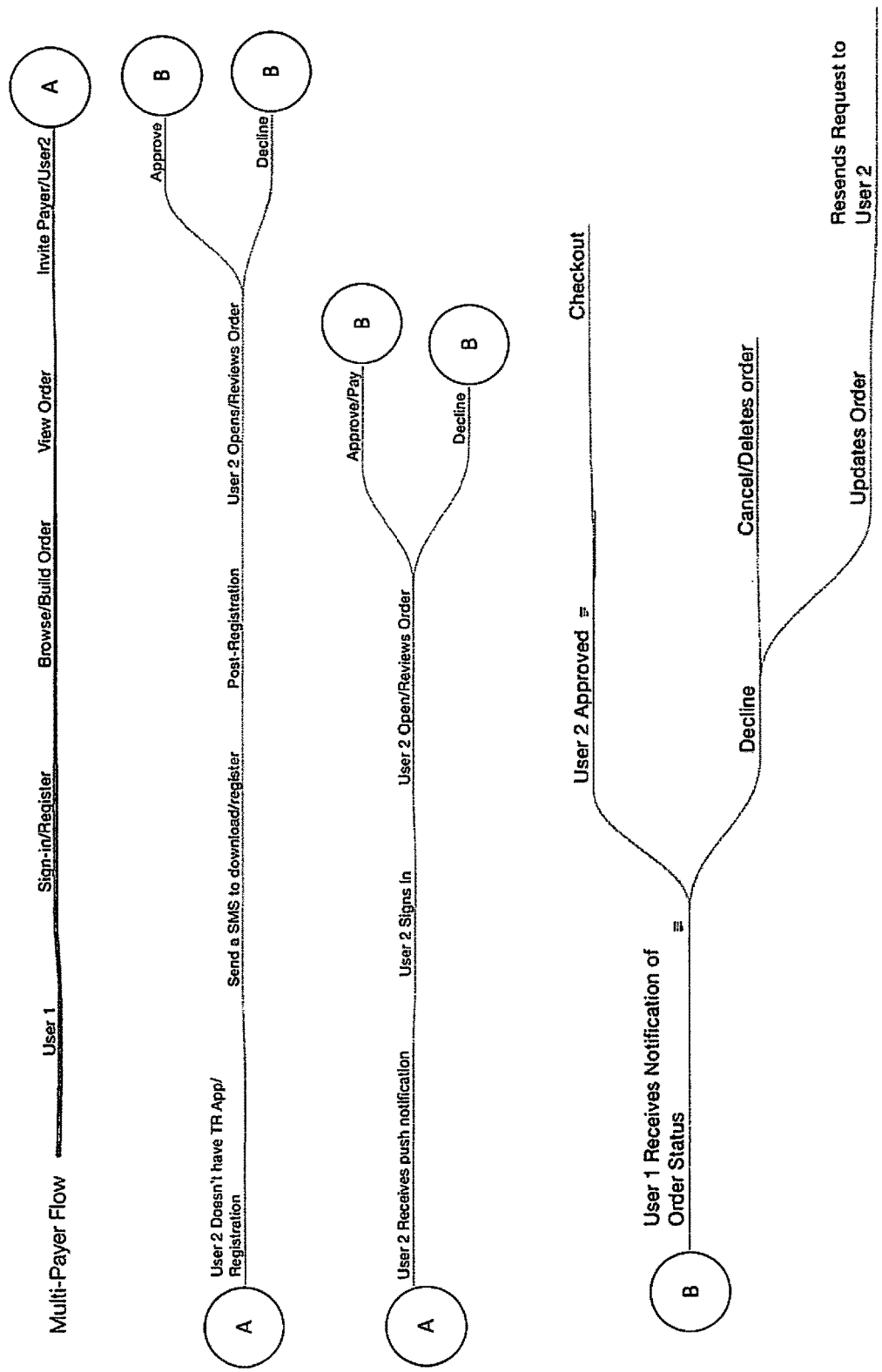
FIG. 5 is a flow diagram illustrating an exemplary multi-party payment process.

FIG. 5 is a flowchart providing an exemplary multi-payer workflow. In this example, a first user, such as a contractor, signs/in/registers with the on-demand service using an app on the user's mobile device. The first user browses available items on the app, builds an order, views the order to confirm its accuracy, and then invites an second user payer to view and/or pay for the order.

The system receives the input from the first user to invite the second user to view/pay for the order and communicates with the second user on the second user's device, e.g., by sending notifications to the second users device. If the second user doesn't have the app and/or hasn't registered, the system sends an SMS to the second user to download and/or register. After the second user registers, the second user opens the app and reviews the order. The second user than approves or declines the order. If the user already has the app, the system sends the second user a push notification, the second user signs in, opens and reviews the order, and approves or declines the order.

The system next provides a notification of the order status to the first user. If the second user approved the order, the first user is notified and uses the app to complete the checkout process for the order. If the second user declined the order, the first user provides input to cancel/delete the order or update the order and resend a request for the second user to view and approve the updated order.

If the second user is an employee of a corporation or other business entity for whom a project is being performed, the second user can be authorized to use a user account established for that entity. When the first user requests that the entity pay for the order, the second user is contacted and able to pay for the order on behalf of the entity, e.g., using the credit card information stored for the entity user account.

FIGS. 6A-L illustrate exemplary user interface layouts used in an exemplary third-party approval work flow. FIGS. 6A-H illustrate user interfaces that could be presented on a mobile or other device of a first user, e.g., a contractor, homeowner, business owner, or other purchaser/requester.

FIG. 6A is a block diagram illustrating an example user interface for creating an order for approval. In this example, the user interface includes a Back button, a shopping cart label, a cart icon, a list of items, features to add/remove items from the list of items, a cart sub-total, a checkout option, a select approver option, and a continue shopping option.

FIG. 6B is a block diagram illustrating an example user interface for selecting an approver to pay for or otherwise approve the order. For example, the contractor may use the user interface to identify the homeowner that will pay for and/or approve the order. This user interface may be displayed following a selection of a "select approver" option on the user interface of FIG. 6A. In this example, the user interface includes a Back button, a shopping cart label, a cart icon, a search tool for searching for contacts (e.g., searching through the contacts that are available in a contacts app locally on the device), a list of contacts, and features to select one or more of the contacts in the list of contacts as an approver.

Figure 6D:
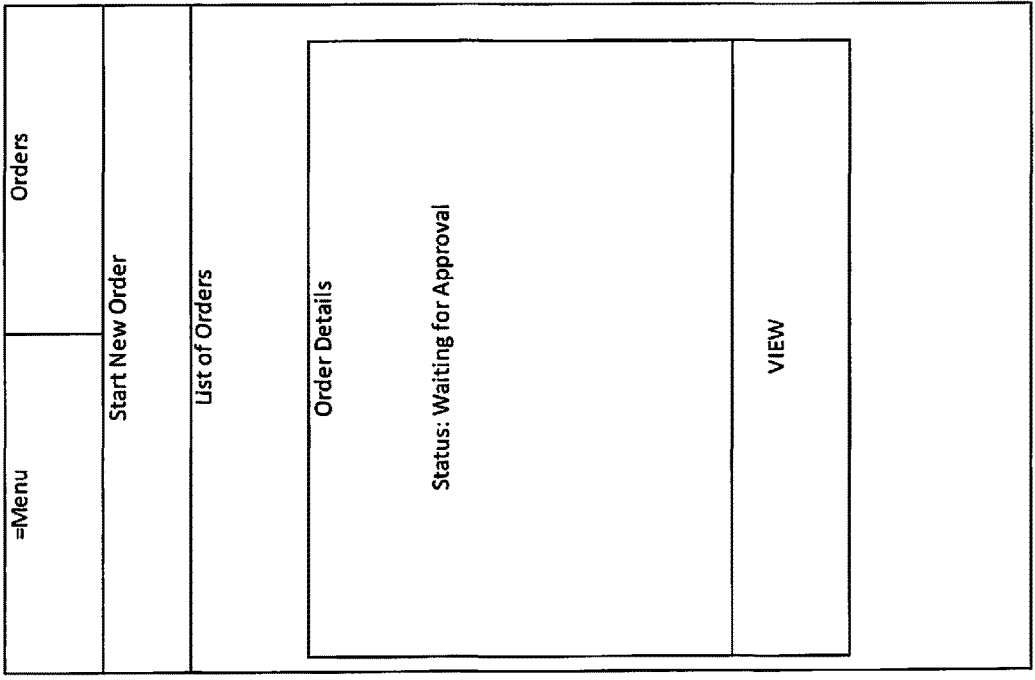
FIG. 6D is a block diagram illustrating an example user interface identifying order activity—Status: Waiting for Approval.
Figure 6C:
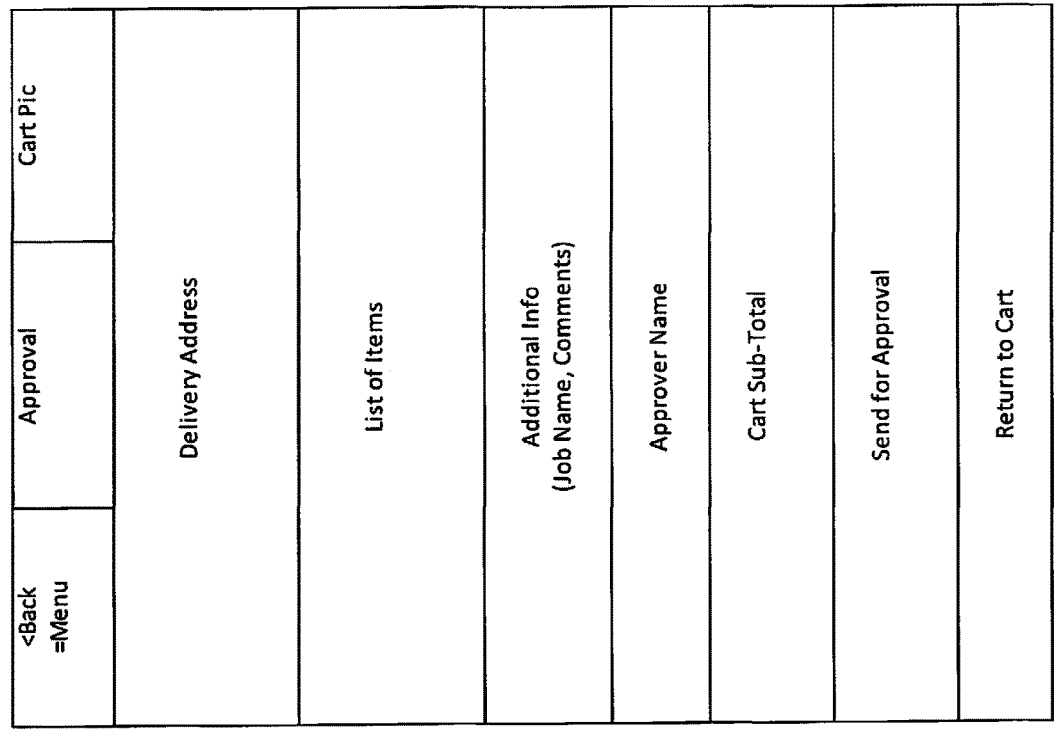
FIG. 6C is a block diagram illustrating an example user interface for sending a request for approval.

FIG. 6C is a block diagram illustrating an example user interface for sending a request for approval. This user interface may be displayed following a selection of an approver on the user interface of FIG. 6B. In this example, the user interface includes a Back button, an approval heading, a cart pic, a delivery address, a list of items in the order, additional information (e.g., job name, comments, etc.), an approver name, a cart sub-total, an option to send for approval, and an option to return to the shopping cart.

FIG. 6D is a block diagram illustrating an example user interface identifying order activity—Status: Waiting for Approval. This user interface is displayed when an order is waiting for approval, e.g., following selection of the send for approval option of the user interface of FIG. 6C.

Figure 6F:
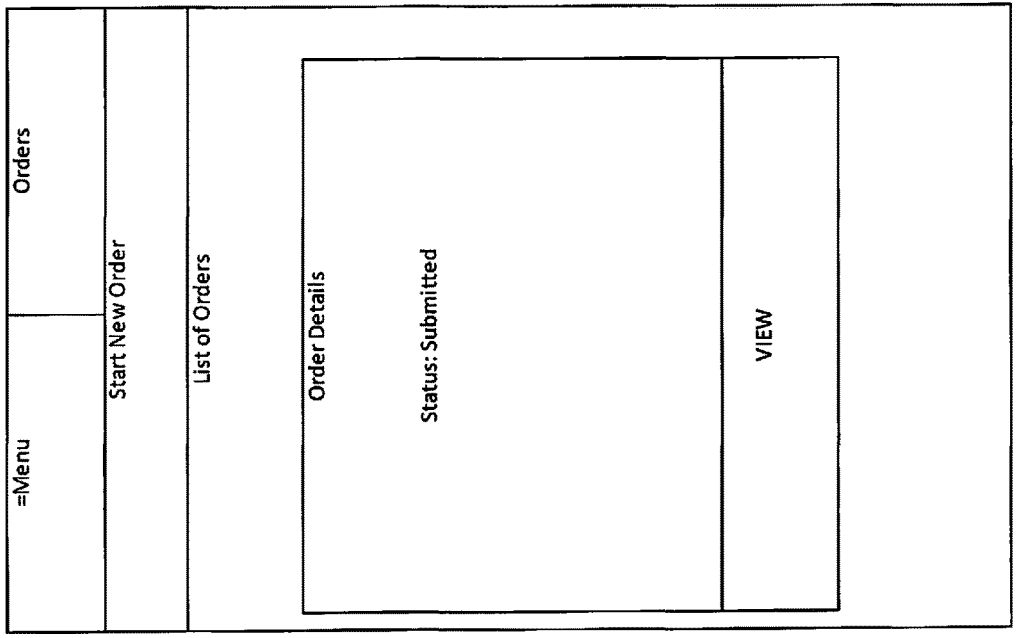
FIG. 6F is a block diagram illustrating an example user interface identifying order activity—Status: Order Submitted.
Figure 6E:
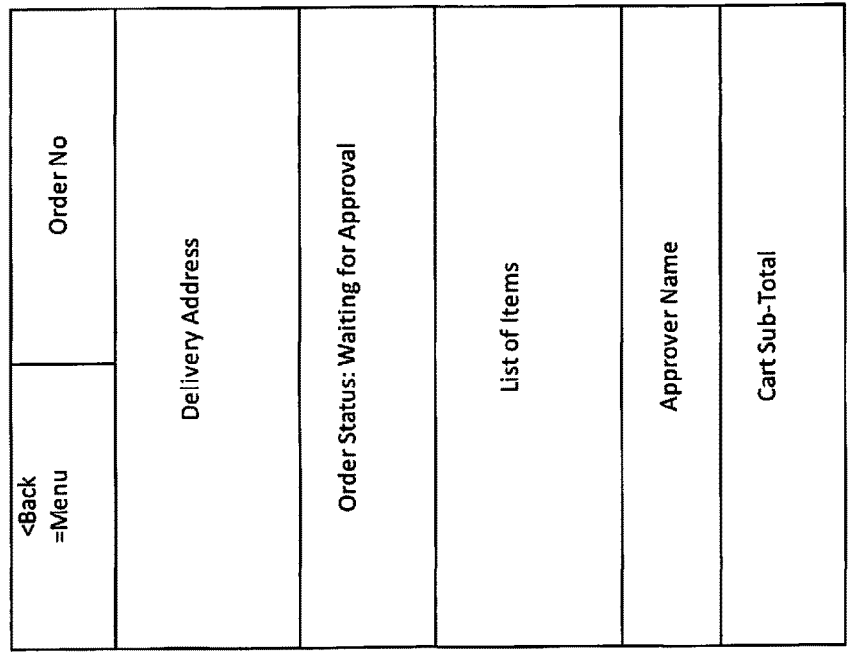
FIG. 6E is a block diagram illustrating an example user interface for viewing an order.

FIG. 6E is a block diagram illustrating an example user interface for viewing an order. In this example, the user interface includes a Back button, an order number, a delivery address, an order status, a list of items, the approver name, and the cart sub-total.

FIG. 6F is a block diagram illustrating an example user interface identifying order activity—Status: Order Submitted. This user interface is presented following the submission of the order for approval.

FIG. 6G is a block diagram illustrating an example user interface identifying order activity—Status: Denied. In this example, the user interface includes a Back button, an orders label, a start new order option, a list of orders label, an orders detail section, a view/edit option, and a resend option.

FIG. 6H is a block diagram illustrating an example user interface for viewing the order. In this example, the user interface includes a Back button, a shopping cart label, a cart icon, a list of items, user interface features for adding, changing, or removing the items, the cart sub-total, a checkout option, a select approver (disabled here) option, and a continue shopping option. The select approver option is disabled because the order has already been submitted for approval when this user interface is displayed.

Figure 6J:
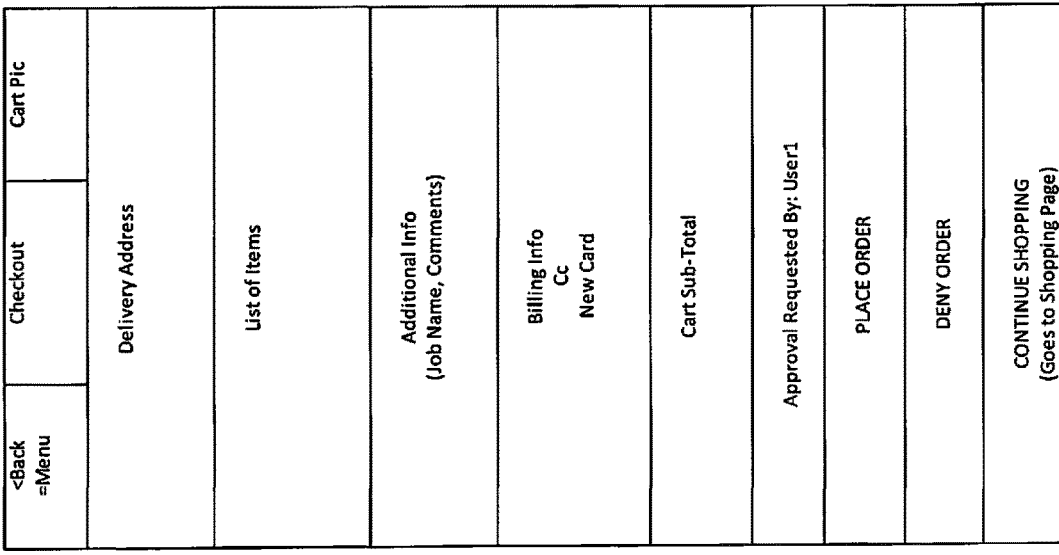
FIG. 6J is a block diagram illustrating an example user interface for order approval.
Figure 6I:
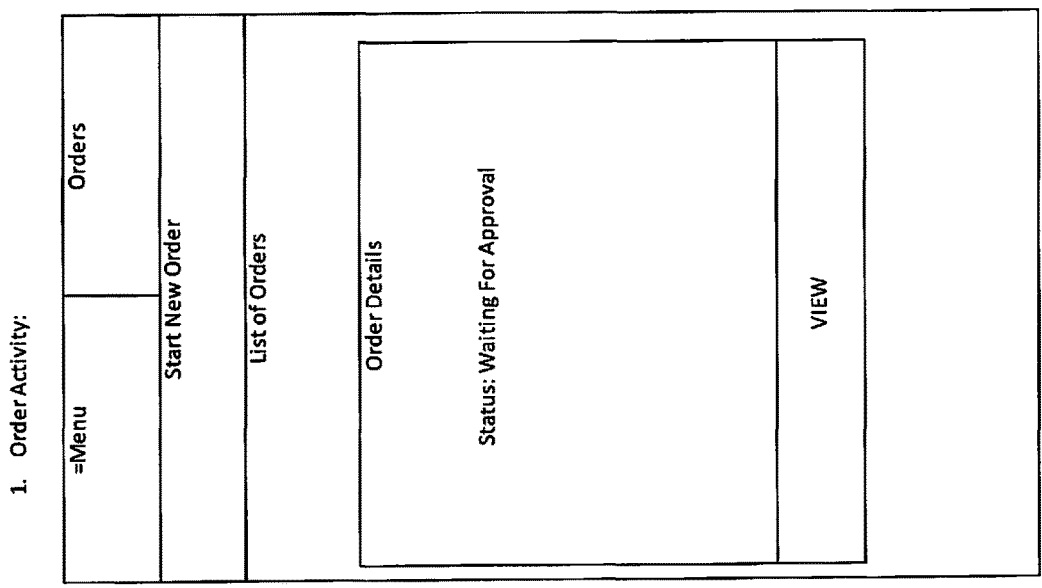
FIG. 6I is a block diagram illustrating an example user interface identifying order activity—Status: Waiting for Approval.

FIGS. 6I-L illustrate user interfaces that could be presented on a mobile or other device of a second user, e.g., a contractor, homeowner, business owner, or other approver/payer. FIG. 6I is a block diagram illustrating an example user interface identifying order activity—Status: Waiting for Approval. This user interface is displayed when an order is waiting for approval. In this example, the user interface includes a Menu button, an orders label, a start new order option, a list of orders label, an orders detail section, and a view/edit option.

FIG. 6J is a block diagram illustrating an example user interface for order approval. This user interface could be presented in response to a selection of the view/edit option of the user interface of FIG. 6I. In this example, the user interface includes a Menu button, a checkout label, a cart icon, a delivery address, a list of items, additional information (e.g., job name, comments, etc.), billing information, options for adding/editing billing information, a cart sub-total, an approval requested by label, a place order option, a deny order option, and a continue shopping option.

Figure 6L:
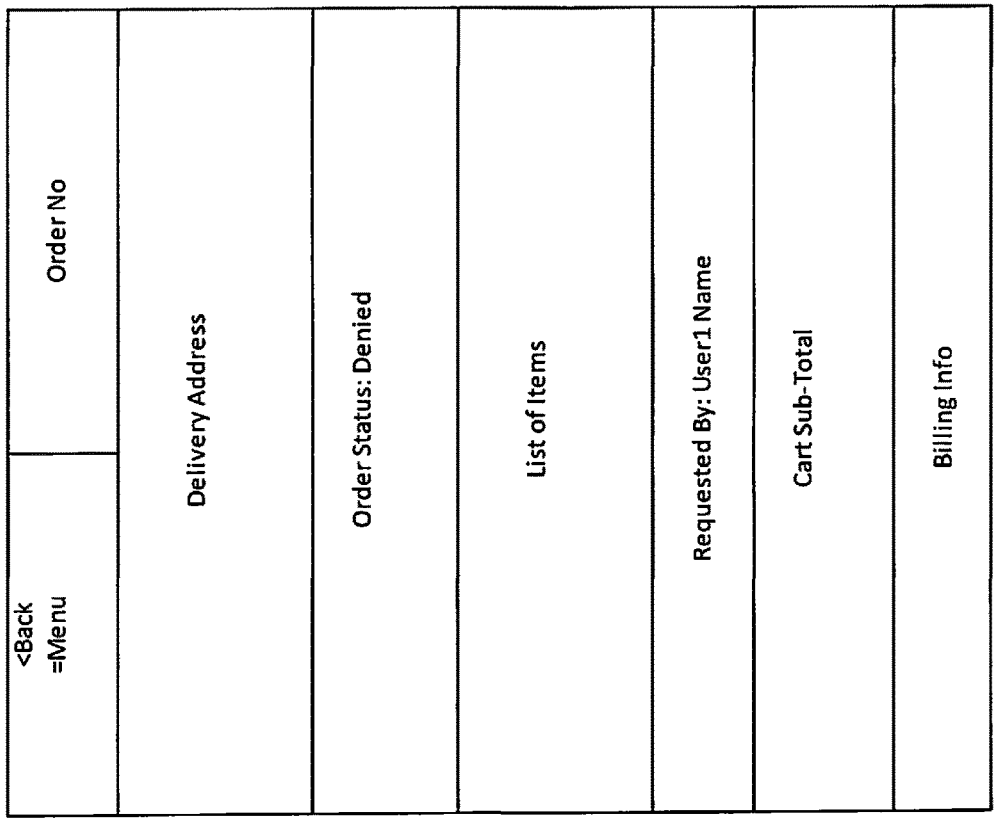
FIG. 6L is a block diagram illustrating an example user interface for viewing the order.
Figure 6K:
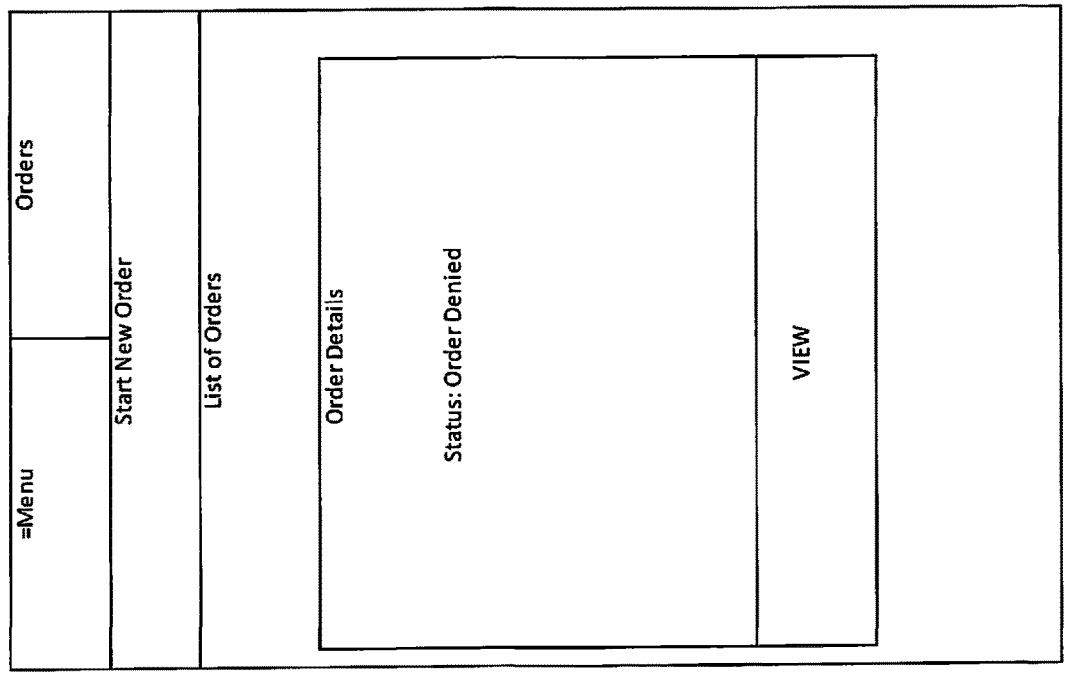
FIG. 6K is a block diagram illustrating an example user interface for identifying order activity—Status: Denied.

FIG. 6K is a block diagram illustrating an example user interface for identifying order activity—Status: Denied. In this example, the user interface includes a Back button, an orders label, a start new order option, a list of orders label, an orders detail section, a view/edit option.

FIG. 6L is a block diagram illustrating an example user interface for viewing the order. This user interface may be displayed upon selection of the view/edit option of the user interface of FIG. 6K. In this example, the user interface includes a Back button, an order number, a delivery address, an order status label, a list of items, a requested by label, a cart sub-total, and billing information.

On-demand delivery services can use various payment paradigms. In one implementation of the invention, the system implements flat fee pricing based on fixed weight ranges and/or dimension ranges that correspond generally to vehicle capabilities. The pricing accounts for average loading and unloading requirements of orders having the expected weight and dimension characteristics. In another implementation of the invention, the system tracks and analyzes unloading and loading times based on the items in an order and learns to predict load and unload times based on the items included in the order. Artificial intelligence techniques can be used to make such predictions, for example, by training a neural network to predict load/unload times given ground truth examples. Given such loading/unloading estimates, the system can be configured to provide order specific delivery charges that account for pulling time, driving time, loading time, and/or unloading time, for example, by accounting for total time and/or total cost of the particular delivery process.

On-demand delivery services can additionally or alternatively account for timing expectations that are tracked and learned. For example, the system can learn how to estimate how long it will take a puller to pull the items of a given order based on the items in the order, the fulfillment center, and/or puller identity/attributes. Based on this, the system can predict when a driver should arrive at the fulfillment center to minimize downtime of the driver and/or puller. In addition, the system can account for traffic to schedule a driver to depart for the fulfillment facility to ensure arrival at a desired time in light of traffic and other variable conditions.

The Puller Mobile App

The puller mobile app can store and display order details, product details, text/chatting capabilities, driver information, limited credit card usage constraints (i.e., time, proximity, and/or amount), revenue management features (e.g., showing money earned, shift worked, rating, customer), a historical view of orders, and/or allow confirmation of handoff of an order to the driver. The order details can include customer name, e-mail, phone, delivery address, order status (and ability to update), features for selecting/locking an order to fulfill, and/or provide information about start and stop time for pulling/fulfilling the order. The product details can include a SKU, a model number, an in-store location, stock/availability information, and/or retail/store information. The driver information can include the driver's name, vehicle information, contact information, a picture of the driver and/or vehicle, an ETA, and/or mobile payment information.

The Driver Mobile App

The driver mobile app can store and display order details, product details, texting/chatting capabilities, drive information, maps, connected car integration, features to confirm handoff to driver feature, puller information, revenue management features, a historical view of deliveries, and a confirm delivery was completed feature. The order details can include the customer name, e-mail, phone, and/or delivery address, and/or a feature for selecting/locking an order to deliver. The product details can include a SKU number, model number, in-store location, stock/availability information, and/or retail/store information. The drive information can include the name, vehicle information, contact information, and a picture of the customer and/or building at the job site. The maps can include the pickup site, the drop off location, the miles driven, and/or the time. The puller information can include the name, picture, and/or contact information, limited credit card usage constraints (i.e., time, proximity, and/or amount), and/or rating. The features for confirming complete delivery can include an e-signature feature and/or a feature for uploading an image/photo of the items at the site, etc.

Exemplary Computing Device

Figure 7:
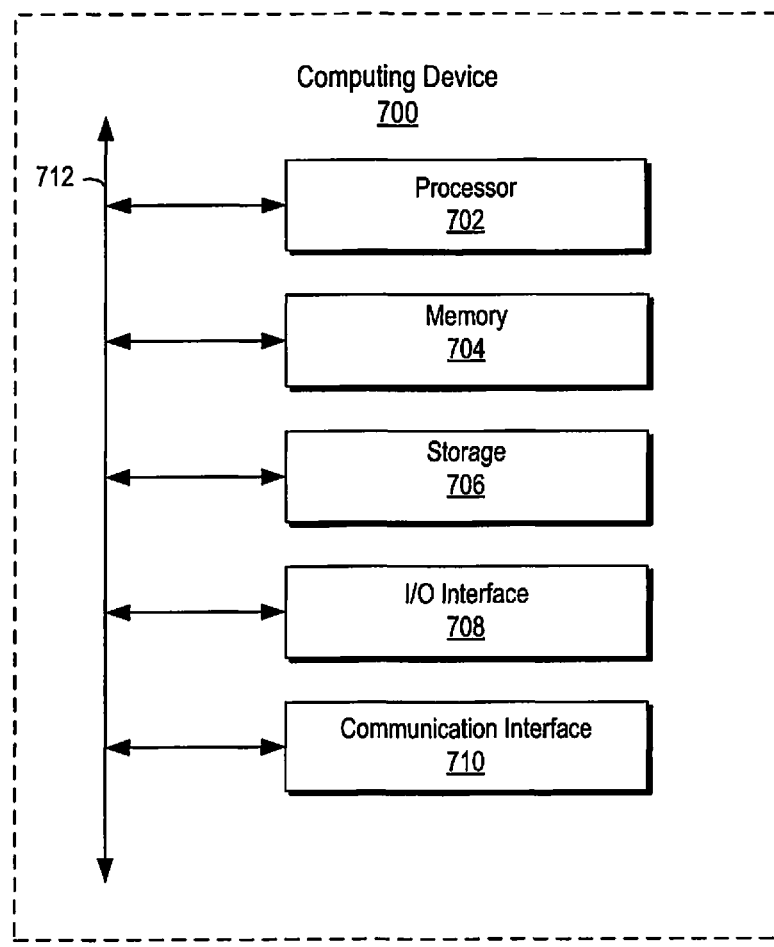
FIG. 7 illustrates an exemplary computing device for implementing one or more of the modules and/or features disclosed herein.

FIG. 7 illustrates and exemplary computing device for implementing one or more of the modules and/or features disclosed herein. FIG. 7 is a block diagram depicting example hardware implementations for the servers and devices described herein. Each such device 700 may include a processor 702 that is communicatively coupled to memory 704 and storage 706 and that executes computer-executable program code and/or access information stored in the memory 704 and storage 706. The processor 702 may comprise a microprocessor, an application-specific integrated circuit ("ASIC"), a state machine, or other processing device. The processor 702 can include any of a number of processing devices, including one. Such a processor 702 can include or may be in communication with a computer-readable medium storing instructions that, when executed by the process, cause the processor to perform the operations described herein.

The memory 704 and storage 706 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++ C#, Visual Basic, Java, Python, Perl, and JavaScript.

The device 700 may also comprise a number of external or internal devices such as input or output devices. For example, the device 700 may have input/output ("I/O") interface 708 that can receive input from input devices or provide output to output devices. A bus 712 can also be included in the device 700. The bus 712 can communicatively couple one or more components of the server. The server can execute program code that configures the processor to perform one or more of the operations described above with respect to the Figures. The program code may be included in the memory or any suitable computer-readable medium and may be executed by the processor or any other suitable processor. In additional or alternative embodiments, program code can be resident in a memory that is accessible via a data network, such as a memory accessible to a cloud service.

The device 700 can also include at least one network interface device or other communication interface 710. The communication interface 710 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

An electronic device can be a computer, telephone, mobile device, tablet, smart phone, smart watch, or any communications device. A communications device can include a processor, memory, a bus, input/output components, network interface components, and other appropriate communication components. Non-limiting examples of input devices include a touch screen (e.g., one or more cameras for imaging a touch area or pressure sensors for detecting pressure change caused by a touch), a mouse, a keyboard, or any other device that can be used to generate input events in response to physical actions by a user of a computing device, or a microphone. Non-limiting examples of output devices include an LCD screen, an external monitor, a speaker, or any other device that can be used to display or otherwise present outputs generated by a computing device. The device can execute program code that configures the processor to perform one or more of the operations described above.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not be described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

The foregoing description and summary of the invention are to be understood as being in every respect illustrative and exemplary, but not restrictive, and the scope of the invention disclosed herein is not to be determined only from the detailed description of illustrative embodiments but according to the full breadth permitted by patent laws. It is to be understood that the embodiments shown and described herein are only illustrative of the principles of the present invention and that various modification may be implemented by those skilled in the art without departing from the scope and spirit of the invention.

What is claimed is:

1. A method for device-based coordination of multi-party delivery processes, the method comprising:
   at a device with one or more processors and a non-transitory computer-readable storage medium:
   receiving a payer-invite request from a user interface on a first application on a requester device, the payer-invite request requesting an invitation be sent to a payer to pay for a delivery order via a second application on a payer device, the delivery order identifying one or more items to be purchased and delivered to a requester location associated with the requester device or inputted by the requester, wherein the payer is selected via a feature provided on the user interface on the first application on the requester device;
   sending the invitation to the payer device associated with the payer;
   receiving a payment from the payer device, the payment provided in response to the invitation;
   identifying a fulfillment center associated with a merchant;
   identifying a type of vehicle;
   sending a communication to purchase the one or more items from the merchant with pickup at the fulfillment center; and
   sending a driving instruction to a driver device or a vehicle device, the driving instruction instructing pick up of the one or more items at the fulfillment center and delivery of the one or more items to the requester location.

2. The method of claim 1, wherein the first application on the requester device is the same application as the second application on the payer device.

3. The method of claim 1, wherein the first application on the requester device is a different application than the second application on the payer device.

4. The method of claim 1, wherein sending the invitation comprises sending a text message including a selectable link for downloading the device app to view and provide payment for the delivery order.

5. The method of claim 1, further comprising receiving a change to the delivery order from the payer device, the change changing the one or more items to be purchased and delivered.

6. The method of claim 1, further comprising receiving an original delivery order with an item type from the requester device and a modified delivery order from the payer device identifying a particular item of the item type.

7. The method of claim 1, further comprising sending a confirmation to the requester device, the confirmation confirming that the payment was provided by the payer for the delivery order.

8. The method of claim 1, wherein identifying the fulfillment center associated with the merchant comprises accessing a dataset to determine that the one or more items are in stock at the fulfillment center.

9. The method of claim 1, further comprising:
identifying a puller based on a requester location or a fulfillment center location; and
sending a pulling instruction to a puller device, the pulling instruction instructing a puller to collect the one or more items of the delivery order at the fulfillment center.

10. The method of claim 9, wherein identifying the puller is based on a time capacity of the puller to perform activities required by the pulling instructions in a time period required for the delivery order.

11. The method of claim 1, wherein:
identifying the fulfillment center associated with the merchant is based on a fulfillment center location of the fulfillment center and the requester location; and
identifying the type of vehicle for the delivery is based on identifying characteristics of the one or more items and vehicle capabilities associated with the type of vehicle, wherein the characteristics of the one or more items are based on dimensions or weight of the one or more items.

12. The method of claim 11, wherein the identified characteristics of the one or more items are based on dimensions of the one or more items.

13. The method of claim 11, wherein the identified characteristics of the one or more items are based on weight of the one or more items.

14. The method of claim 1, further comprising:
receiving input specifying vehicle capabilities associated with the type of vehicle via the application on the driver device used by a driver.

15. The method of claim 1, wherein vehicle capabilities associated with the type of vehicle are determined based on vehicle requirements that require that the vehicle to include a dolly, a lift-gate, a truck bed, or a roof.

16. The method of claim 1, wherein vehicle capabilities associated with the type of vehicle are determined based on input provided on the driver device or the vehicle device.

17. The method of claim 1, wherein vehicle capabilities associated with the type of vehicle are determined based on current weather conditions.

18. The method of claim 1, wherein identifying the fulfillment center comprises identifying multiple fulfillment centers to pickup the one or more items, and the driving instruction includes instructions to pick up a first portion of the one or more items at a first fulfillment center and a second portion of the one or more items at a second fulfillment center.

19. The method of claim 1, wherein the delivery order specifies one or more attributes associated with the one or more items, and wherein the second application on the payer device is configured to:
receive, from the payer at a user interface on the second application on the payer device, input associated with updating the one or more items to be purchased and delivered to the requester location; and
send, to the first application on the requester device, a communication to purchase the updated one or more items from the merchant.

20. The method of claim 1, wherein the driver device or the vehicle device are associated with multiple vehicles associated with a delivery entity, wherein sending the driving instruction to the driver device or the vehicle device comprises sending the driving instruction to the delivery entity.

21. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
receiving a payer-invite request from a user interface on a first application on a requester device, the payer-invite request requesting an invitation be sent to a payer to pay for a delivery order via a second application on a payer device, the delivery order identifying one or more items to be purchased and delivered to a requester location associated with the requester device or inputted by the requester, wherein the payer is selected via a feature provided on the user interface on the first application on the requester device;
sending the invitation to the payer device associated with the payer;
receiving a payment from the payer device, the payment provided in response to the invitation;
identifying a fulfillment center associated with a merchant;
identifying a type of vehicle;
sending a communication to purchase the one or more items from the merchant with pickup at the fulfillment center; and
sending a driving instruction to a driver device or a vehicle device, the driving instruction instructing pick up of the one or more items at the fulfillment center and delivery of the one or more items to the requester location.

22. The system of claim 21, wherein the first application on the requester device is the same application as the second application on the payer device.

23. The system of claim 21, wherein the first application on the requester device is a different application than the second application on the payer device.

24. The system of claim 21, wherein identifying the fulfillment center comprises identifying multiple fulfillment centers to pickup the one or more items, and the driving instruction includes instructions to pick up a first portion of the one or more items at a first fulfillment center and a second portion of the one or more items at a second fulfillment center.

25. The system of claim 21, wherein the driver device or the vehicle device are associated with multiple vehicles associated with a delivery entity, wherein sending the driving instruction to the driver device or the vehicle device comprises sending the driving instruction to the delivery entity.

* * * * *